United States Patent
Olarte

(10) Patent No.: US 7,467,453 B2
(45) Date of Patent: Dec. 23, 2008

(54) PEW AND BENCH WITH PIVOTING SEAT

(75) Inventor: Alvaro Mauricio Olarte, Aventura, FL (US)

(73) Assignee: Series International, LLC, Miami, FL (US)

( * ) Notice: Subject to any disclaimer, the term of this patent is extended or adjusted under 35 U.S.C. 154(b) by 0 days.

(21) Appl. No.: 11/622,270

(22) Filed: Jan. 11, 2007

(65) Prior Publication Data
US 2007/0107178 A1   May 17, 2007

Related U.S. Application Data

(62) Division of application No. 10/756,743, filed on Jan. 13, 2004, now Pat. No. 7,204,553.

(51) Int. Cl.
*B21D 39/00* (2006.01)
*A47C 1/00* (2006.01)

(52) U.S. Cl. .......................................... 29/428; 297/331

(58) Field of Classification Search .................. 29/428, 29/525.01; 297/331, 248, 463.2; 248/346.01, 248/188.1, 188.8
See application file for complete search history.

(56) References Cited

U.S. PATENT DOCUMENTS

| 1,662,378 A | * | 3/1928 | Duke | 297/257 |
|---|---|---|---|---|
| 2,853,119 A | * | 9/1958 | Balfour | 224/487 |
| 3,300,246 A | | 1/1967 | Bouche | 297/232 |
| D221,642 S | | 8/1971 | Bayes | 430/325 |
| 3,762,765 A | | 10/1973 | Piretti | 297/162 |
| 3,785,600 A | * | 1/1974 | Padovano | 248/188.1 |
| 3,796,459 A | | 3/1974 | Weber | 297/60 |
| 3,850,476 A | | 11/1974 | Day | 297/335 |
| 4,850,159 A | | 7/1989 | Conner | 52/9 |
| 4,989,915 A | | 2/1991 | Hansal | 297/378 |
| 5,306,072 A | | 4/1994 | Caldwell | 297/232 |
| 5,470,128 A | | 11/1995 | Kerkham | 297/232 |
| 5,529,376 A | | 6/1996 | Jovan et al. | 297/257 |
| 5,553,923 A | | 9/1996 | Bilezikjian | 297/452 |
| 5,845,964 A | | 12/1998 | Phoon | 297/162 |
| 5,878,470 A | * | 3/1999 | Blansett | 29/91.1 |
| 5,890,761 A | | 4/1999 | Miller | 297/232 |
| 6,095,603 A | | 8/2000 | Hock | 297/232 |
| 6,135,562 A | | 10/2000 | Infanti | 297/440 |
| 6,296,315 B1 | | 10/2001 | Jensen | 297/452 |
| 6,839,950 B2 | * | 1/2005 | Guillot | 29/428 |
| 2004/0100134 A1 | * | 5/2004 | Plant et al. | 297/331 |

* cited by examiner

*Primary Examiner*—Milton Nelson, Jr.
(74) *Attorney, Agent, or Firm*—St. Onge Steward Johnston & Reens LLC

(57) ABSTRACT

A pivoting seat pew or bench furniture, which utilizes the benefits of theater style seating with the functionality and aesthetic of a traditional pew. This seating assembly provides additional seating capacity over traditional pews offering lower seating costs and lower construction costs. This seating assembly also provides modularized seating components so that the seating assembly can be constructed to any desired length without requiring customized construction or components.

22 Claims, 19 Drawing Sheets

PEW AND BENCH WITH PIVOTING SEAT

CROSS-REFERENCE TO RELATED APPLICATIONS

This application is a divisional of U.S. patent application Ser. No. 10/756,743 filed on Jan. 13, 2004 now U.S. Pat. No. 7,204,553.

FIELD OF THE INVENTION

This invention relates generally to pew or bench seating. This invention relates specifically to a pivoting seat pew or bench which incorporates many benefits of theater style seating with the functionality and aesthetics of a traditional pew.

BACKGROUND OF THE INVENTION

In recent years, church congregations shopping for fixed seating have encountered a growing dilemma in reaching a consensus over the choice of pews versus theater seats. For the past decade the number of theater seats purchased by churches has grown significantly each succeeding year. At the same time, the sentiment of many congregation members in favor of pews runs as deep as the roots of church tradition.

One of the strongest appeals that have made theater seats attractive to churches is the extra egress space achieved by the self-lifting seats. Egress space is the passage room between the rows of seats. Ample egress space provides benefits in not only audience comfort and safety, but also contributes to ease for maintenance and cleaning purposes.

Pews that are spaced a typical 36" back-to-back may leave only about 12" of egress, which is a typical minimum fire code requirement. Theater seating, utilizing self-lifting seats, increase this exit passage dramatically. The present invention is a seating assembly that embodies all of the important features of both pews and theater seats in one product. The present invention maintains the traditional appearance of pews while offering the benefits of self-lifting seats. In fact, the present invention provides advantage over what is offered by either conventional pews or conventional theater seats.

This egress dimension is just one of the areas where the present invention is more advantageous than traditional seating. The present invention can provide 22" or more of passageway between rows, which can be double that of conventional pews and up to 50% more than most theater seats. This extra passage, while obviously providing greater worship space and traffic flow, also offers benefits in the form of greater seat capacity, lower seating costs, and lower construction costs.

Building codes restrict the length of a conventional pew based on the egress space. A typical code may restrict pew length to between 20' to 25" where an egress of 12" is provided. As egress space increases, it becomes easier for people to maneuver between rows and thus evacuation time will increase in the case of an emergency. Therefore, various building codes will permit additional seating and longer pews as egress space increases. Generally, an additional three seats are allowed for each one inch increase of egress. Accordingly, by increasing the available egress, the present invention could extend to more than 3 times the allowable length of a conventional pew without violating code.

The present invention could increase seat capacity over conventional pews. Longer rows mean that fewer aisles are required throughout the facility and fewer aisles obviously allow more floor space to be committed to seating, producing additional seat capacity. Even if the initial cost of the present invention is more than the average pew, the added product cost is far less than the added construction cost would be to expand the worship facility accommodate the provided seating increase. Thus, the present invention provided lower seating costs per person.

Aisle ways often empty into doorways. Because fewer aisles are needed with the present invention, fewer doorways are required in a construction plan, lowering overall construction costs. Similarly, the greater seating capacity eliminates the need for many intermediate steps in balcony related construction where aisles are deleted, further reducing costs.

The present invention allows for the elimination of arm dividers typical to most theater seats, which can be cumbersome. Arm dividers in conventional theater seats occupy 2 to 3 inches of seat width per seating unit, prohibit continuous seating, are a problem to larger people, and add maintenance as well as cost.

The present invention may also greatly reduce the noise and maintenance often associated with self-lifting seats. The present invention seat lift preferably will be a gravity lift, counter balance seat mechanism free of springs and other mechanics that generally create noise and ongoing maintenance. A preferred means of a self lifting seating assembly is disclosed in U.S. Pat. No. 6,698,834. Any additional benefits of such a seating assembly are disclosed therein.

Also, traditional pews must be custom built to reach a desired or specified width. The present invention employs modularity to its assembly components to allow it to meet any desired or specified length. The use of standardized parts and modular assembly also provides for ease in adjustments in both seating design and assembly. The modular components also allow for ease in repair and maintenance of the bench.

Finally, the present invention requires fewer supports than either tradition pews or theater seating. This saves in component costs, assembly costs, and also provides great access and ease for cleaning and maintenance.

While worship seating does not have a significant influence on worship itself, the combined physical elements of building and seat design stand to maximize stewardship goals and ministry objectives. The goal of the present invention is to partner with the architectural team in bringing these physical elements together in a way that optimizes these common objectives.

SUMMARY OF THE INVENTION

Accordingly, it is an object of the present invention to provide a seating assembly, which in an unoccupied position provides an increased egress, compared to a traditional pew or a theater seat allowing for longer rows, fewer aisles, and greater overall traffic flow.

Another object of the present invention is to provide a seating assembly with greater seating capacity offering lower seating costs and lower construction costs.

A further object of the present invention is to provide a seating assembly with modularized seating components allowing the seating assembly to be constructed to any desired width without requiring customized construction or components.

Still another object of the present invention is to provide a seating assembly with a design that allows for row lengths to be adjusted in increments of 1 inch on the job site by interchanging seating components.

Yet another object of the present invention is to provide a seat that has flexibility: Seats can be moved from a $1^{st}$ phase worship area to a larger $2^{nd}$ phase facility without modifying or discarding existing backs and seats. By simply adding additional seats and support beams to satisfy new row lengths, existing components can be reused for any desired design.

These and other objects of the present invention are achieved by provision of a bench style seating assembly having a beam with at least one base supporting the beam in a substantially horizontal position and at least one seat back assembly fixedly secured to the beam. The seating assembly will also have seat connection mechanisms with connector supports extending forward in a substantially horizontal position and seat bottom assemblies pivotably secured to the beam by the seat connection mechanisms such that each seat bottom assembly is separately pivotable about an axis through the connector support of the seat connection mechanisms.

It is preferable that the beam is part of a beam assembly having at least one beam having at least one of a first and second beam standard length. The beam assembly may also have at least one beam having at least one of the first and second beam standard lengths joined end to end with at least one other beam having at least one of the first and second beam standard lengths, and that the beam also have at least one beam having at least one of the first and second beam standard lengths joined end to end with a beam extension having a beam custom length. The beam custom length is preferably less than at least one of the first and second beam standard lengths, so as to allow the seating assembly to be substantially any length without requiring customization all beams.

It is also preferable that the first and second standard beam lengths are cut into cut lengths and the first and second standard beam lengths are chosen based on an optimal seat bottom width such that combinations of the at least first and second beam lengths and cut portions of the at least first and second standard beam lengths reach a predetermined bench length without beam waste. Accordingly, each beam length of the combination of the of the first and second beam lengths and the appropriate number of cut lengths of the first and second standard beam lengths is trimmed such that the beam assembly reaches the predetermined length with minimized beam waste when a requested seat bottom width is not the optimal seat bottom width. Preferably, the beam assembly may further comprise a third standard beam length.

It is further preferable that at least one seat bottom assembly has a width different than a width of another seat bottom assembly and that a width of each of the seat bottom assemblies is selected from a group of less than ten standard widths so as to allow the seating assembly to be substantially of any width without requiring customization of widths of the plurality of seat bottom assemblies.

It is also preferable that at a plurality of seat back assemblies are used, and that at least one seat back assembly has a width different than a width of another seat back assembly and that each seat back assembly is substantially the same width as a corresponding seat bottom assembly. A width of each seat back assembly is selected from a group of less than ten standard widths so as to allow the seating assembly to be substantially of any width without requiring customization, of widths of the plurality of seat back assemblies.

Preferably, at least one base is secured in place to the floor or to a step riser and the number of bases is less than the number of seat bottom assemblies. The bases are positioned substantially beneath at least one seat bottom assembly. Preferably, the bases are fixedly secured to the beam with self tapping screws or with a U shaped bracket comprising a plate fastened to the U shaped bracket such that the beam is surrounded by the bracket and plate. Also the seat back assembly may be a single continuous back member.

It is most preferable that that the seat connection mechanisms are configured such that the seat bottom assemblies are gravity lifted where each of seat connection mechanisms has a saddle bracket portion comprising an inner pivot channel and a pin portion comprising a pin protruding therefrom, so that when the pin portion is angled with respect to the saddle bracket portion at an insertion angle, the pin is insertable into and removable from the inner pivot channel, and such that when the pin portion is angled with respect to the saddle bracket portion at an angle other than the insertion angle, the pin is retained in the inner pivot channel.

It is also preferable that an end is attached to either end of the beam to define a width of the seating assembly and that the seat bottom assemblies have removable seat covers and the seat back assemblies have removable back pads.

The objects of the present invention are further achieved by provision of a method of assembling a bench style seating assembly, having the steps of determining a desired width of the seating assembly, selecting a beam and supporting the beam in a substantially horizontal position on a base. The method of assembling a bench style seating assembly also includes fixing at least one seat back assembly to the beam, fixing seat connector mechanisms to the beam and selecting a width of each seat bottom assembly so as to cause the seating assembly to have the desired width. A selected width of a seat bottom assembly is different than a width of another seat bottom assembly. The method of assembling a bench style seating assembly comprises attaching the seat bottom assemblies pivotably to the beam by the seat connection mechanisms.

It is preferable that the step of selecting a beam include the steps of selecting at least one beam of at least one of a first and second beam standard lengths and joining end to end an appropriate number of beams of at least one of the first and second beam standard lengths so that a beam assembly is within at least one of the first and second beam standard lengths of the desired length. It is further preferable that the method have the steps of joining end to end a beam extension of a beam custom length, where the beam custom length is less than at least one of the first and second beam standard lengths and at least one beam of at least one of the first and second beam standard lengths so as to cause the seating assembly to have the desired length without requiring customization all beams.

It is further preferable that an appropriate number of beams are selected from an inventory of the first and second standard beam lengths and an appropriate number of first and second standard beam lengths are cut based on an optimal seat bottom width such that a combination of the at least first and second beam lengths and the appropriate number of cut lengths of the at least first and second standard beam lengths reach a predetermined bench length without beam waste. It is also preferable that an appropriate number of the first and second standard beams lengths and the cut lengths are joined end to end so that a beam assembly is the predetermined length without beam waste. Further, where each beam length of the combination of the first and second beam lengths and the appropriate number of cut lengths of the first and second standard beam lengths is trimmed such that the beam assembly reaches the predetermined length with minimized beam waste when a requested seat bottom width is not the optimal seat bottom width.

It is also preferable that the width of each seat bottom assembly is selected from a group of less than ten standard widths so as to cause the seating assembly to have the desired width without requiring customization of the widths of the seat bottom assemblies.

It is most preferable that the step of fixing the seat back assembly to the beam comprises the steps of selecting a width of seat back assemblies so as to cause the seating assembly to have the desired width, a selected width a seat back assemblies different than a width of another seat back assembly and fixing the seat back assemblies to the beam.

Preferably, the width of each of the seat back assemblies is selected from a group of less than ten standard widths so as to cause the seating assembly to have the desired width without requiring customization of the widths of the seat back assemblies and the width of each of the seat back assemblies is selected to correspond to a width of each of the seat bottom assemblies.

It is also preferable that the step of supporting the beam in a substantially horizontal position on at least one base includes positioning the base substantially beneath the seat bottom assembly and securing the base to the floor. It is also preferable that the step of fixing a seat back assembly to the beam include the step of fixing a seat back assembly, which is a single continuous back member to the beam and the step of installing an end on either end of the seating assembly to define the length of the seat assembly. It is preferable that the seat bottom assemblies are separately pivotable and that the seat connection mechanisms are such that the seat bottom assemblies are gravity lifted.

The objects of the present invention are further achieved by provision of a bench style seating assembly having a beam with a rectangular cross section of a known thickness, a base comprising a U shaped bracket, an opening of the U shaped bracket corresponding to the thickness of the beam, and supporting the beam in a substantially horizontal position such that the beam rests within the U shaped bracket and remains within the U shaped bracket when subjected to a torque. It is preferable that the bench style seating assembly have a seat back assembly comprising a U shaped bracket, the opening of the U shaped bracket corresponding to the thickness of the beam, that is positioned over the beam such that the seat back assembly is fixedly secured to the beam and the beam remains within the opening of the at least one U shaped bracket when subjected to a torque. It is further preferable that the bench style seating assembly have seat connection mechanisms, each including a connector support extending forward in a substantially horizontal position, and a U shaped bracket. The opening of the U shaped bracket corresponding to the thickness of the beam. The U shaped bracket is positioned over the beam such that the seat connection mechanisms are fixedly secured to the beam and the beam remains within the opening of the U shaped brackets when subjected to a torque. Preferable, seat bottom assemblies are pivotably secured to the beam by the seat connection mechanisms, each of the seat bottom assemblies being separately pivotable about an axis through the connector support of the seat connection mechanisms.

The invention and its particular features and advantages will become more apparent from the following detailed description considered with reference to the accompanying drawings.

DETAILED DESCRIPTION OF THE INVENTION

Figure 5:
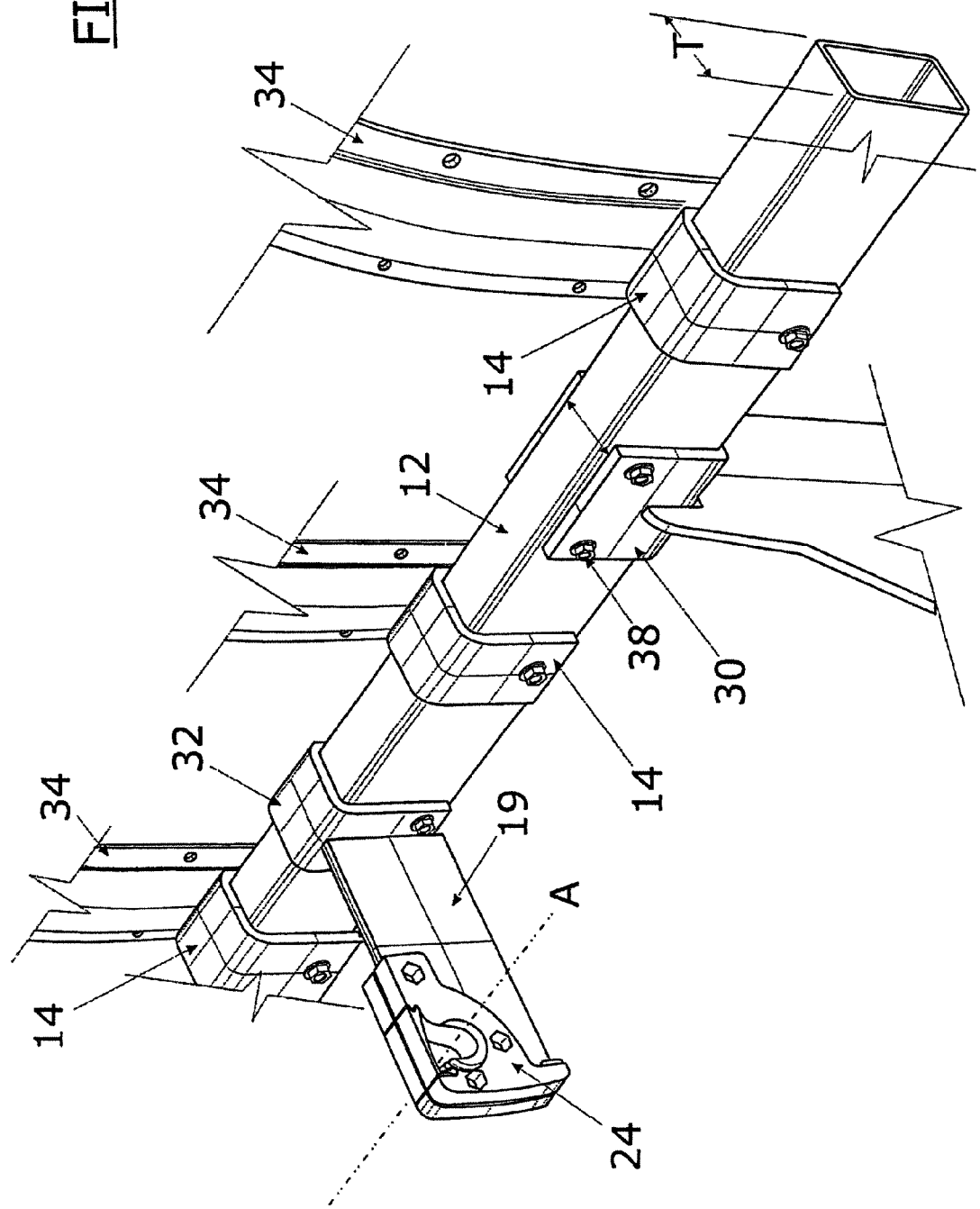
FIG. 5 is a perspective close up view of the beam in accordance with an embodiment of the present invention.

The bench style seating assembly of the present invention is referred to generally as 10. A bench style seat can include a bench, a pew or any such type of elongated seat for two or more people. Referring to FIGS. 1-5, a beam 12 is supported in a substantially horizontal position by at least one base member 11. Preferably, the beam will rest on two base members situated near the far ends of the beam 12. The bases may be secured to the floor or to the riser in a step. The beam 12 will preferable have a rectangular cross section of a known thickness T as illustrated in FIG. 5.

Figure 19:
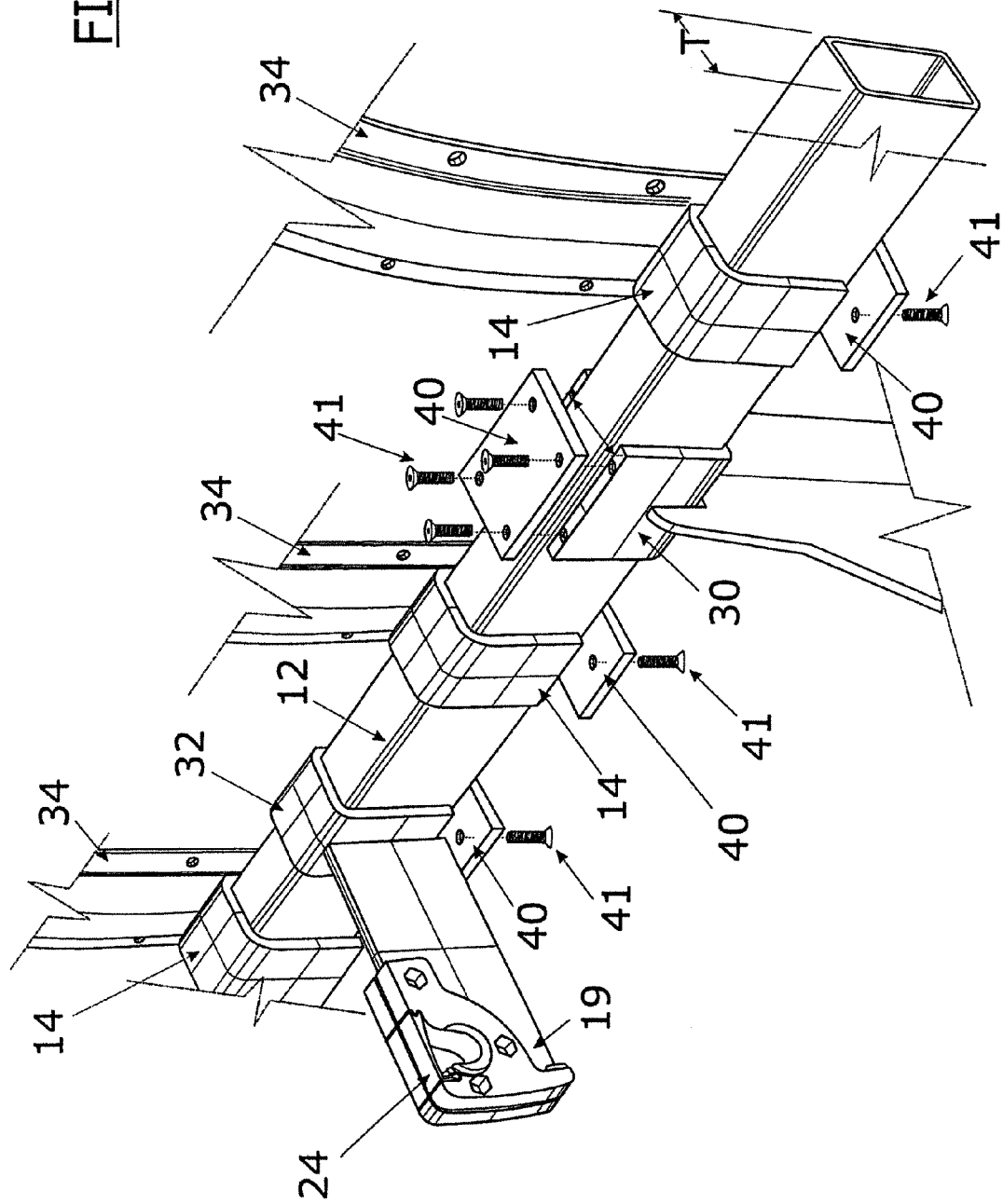
FIG. 19 is a perspective close up view of a beam in accordance with another embodiment of the present invention.

A base member may have a U shaped bracket 30. The opening of the U shaped bracket may be slightly wider than the thickness of the beam so that the beam may rest within the bracket. The U shaped bracket may be positioned so that the lower portion of the bracket is below the top of the base member 11 to give the bracket greater support. The interaction of the bracket with the rectangular cross sectioned beam helps prevent the beam from slipping out of position if it is subjected to a torque. The beam 12 may be secured within the U shaped brackets 30 with self-tapping screws 38. Alternatively, as shown in FIG. 19, a plate 40 may be placed over the bracket and secured to the bracket by screws 41 to secure the beam in the bracket. This way, an installer avoids putting holes in the beam.

The base members 11 can be positioned under the seats, rather than placed between the seats, as done in the prior art. Supporting the beam under the seats increases placement tolerances to two or three inches as opposed to the prior art tolerances of fractions of an inch when placed between the seats. This feature is further useful in allowing flexibility in case of minor changes in desired seat widths or bench lengths. The use of self tapping screws or of the plate and screw design rather than welds allows for easy repositioning of base members in the case of a design change.

At least one seat back assembly can be fixedly secured to the beam 12. The seat back assembly 13 may be secured by a U shaped bracket 14. FIGS. 1-4 illustrate a seating assembly using a plurality of seat back assemblies 13. Extending substantially upwardly from the U shaped bracket 14 is a seat back assembly support 34. In addition to the U-shaped bracket, which fixes and interacts with the beam, each seat back assembly may include a back support 15 and a back pad 16. The back pad 16 may be removable. The removable back pad provides both a simple means of customization. Further, replacing a back pad is much more cost effective maintenance rather than reupholstering a traditional pew.

Again, the opening of the U shaped bracket 14 may be slightly wider than the thickness of the beam 12. In this case, the U shaped bracket 14 can be positioned upside down, and slid over the beam, surrounding the beam on three sides so that the seat back assembly is fixedly secured to the beam. Further, the interaction of the bracket with the rectangular cross sectioned beam helps prevent the seat back assembly from slipping out of position if it is subjected to a torque. Self tapping screws may be used to secure the bracket to the beam or the plate and screw design may be employed.

In addition, each back support 15 of the seat back assemblies may have a groove 33 along each edge that is adjacent to another seat back assembly. Back connector inserts 17 may be slid into these grooves 33 between the back supports 15 for aesthetic reasons, to define seating areas, and for support of the seat back assemblies. Also, a top member 18 may be fitted across the entire width of the seat back assemblies 13, again for aesthetic reasons to achieve a more traditional pew appearance, and to align the plurality of seat back assemblies 13. Top members of at least one standard length may be used.

Seat connection mechanisms 19 may also be fixed to the beam 12. Each seat connection mechanism can extend forward in a substantially horizontal position and includes a connector support 24 on one end and a U shaped seat connection mechanism bracket 32 on the other. Here also, the opening of the U shaped bracket 32 can be slightly wider than the thickness of the beam 12 (see FIGS. 5 and 19). As with the seat back bracket, the seat connection mechanism bracket may be positioned upside down, and slid over the beam, surrounding the beam on three sides. The seat connection mechanism bracket 32 can be fixedly secured with self-tapping screws to the beam or with a plate and screws. Further, the interaction of the bracket with the rectangular cross sectioned beam ensures that the seat back assembly will not slip out of position if it is subjected to a torque.

The seat connection mechanisms are used to connect the seat bottom assemblies 20 to the beam. The seat connection mechanisms 19 can be moved along the beam 12 to accommodate seat bottom assemblies 20 having different widths. The connector support 24 may have a spring loaded, hinged, or any other mechanism of varying design known in the art to accommodate a lifting seat. A single seat connection mechanism 19 may be configured to connect to two seat bottom assemblies. Preferably, each seat bottom assembly 20 will connect to two seat connection mechanisms 19.

Each seat bottom assembly may include a seat support 21 and seat cover 22. The seat cover 22 may be removable for customization purposes as well as for ease in maintenance. Replacing a seat cover is much more cost effective than reupholstering a traditional pew. The seat connector mechanisms 19 may be configured so that each seat bottom assembly 20 can be separately pivotable.

The seat bottom assemblies 20 may be pivotably secured to the beam 12 by the connector supports 24 of the seat connection mechanisms 19. Each seat bottom assemblies may be separately pivotable about an axis A (FIG. 5) going through the connector supports 24 of the of seat connection mechanisms. By placing the axis of rotation A of the seat bottom assemblies forward of the beam 12, more space is provided for the seat bottom assembly to lift to a vertical unoccupied position, providing additional egress space. A spring load mechanism may be used to provide a more compact seating assembly.

Figure 9:
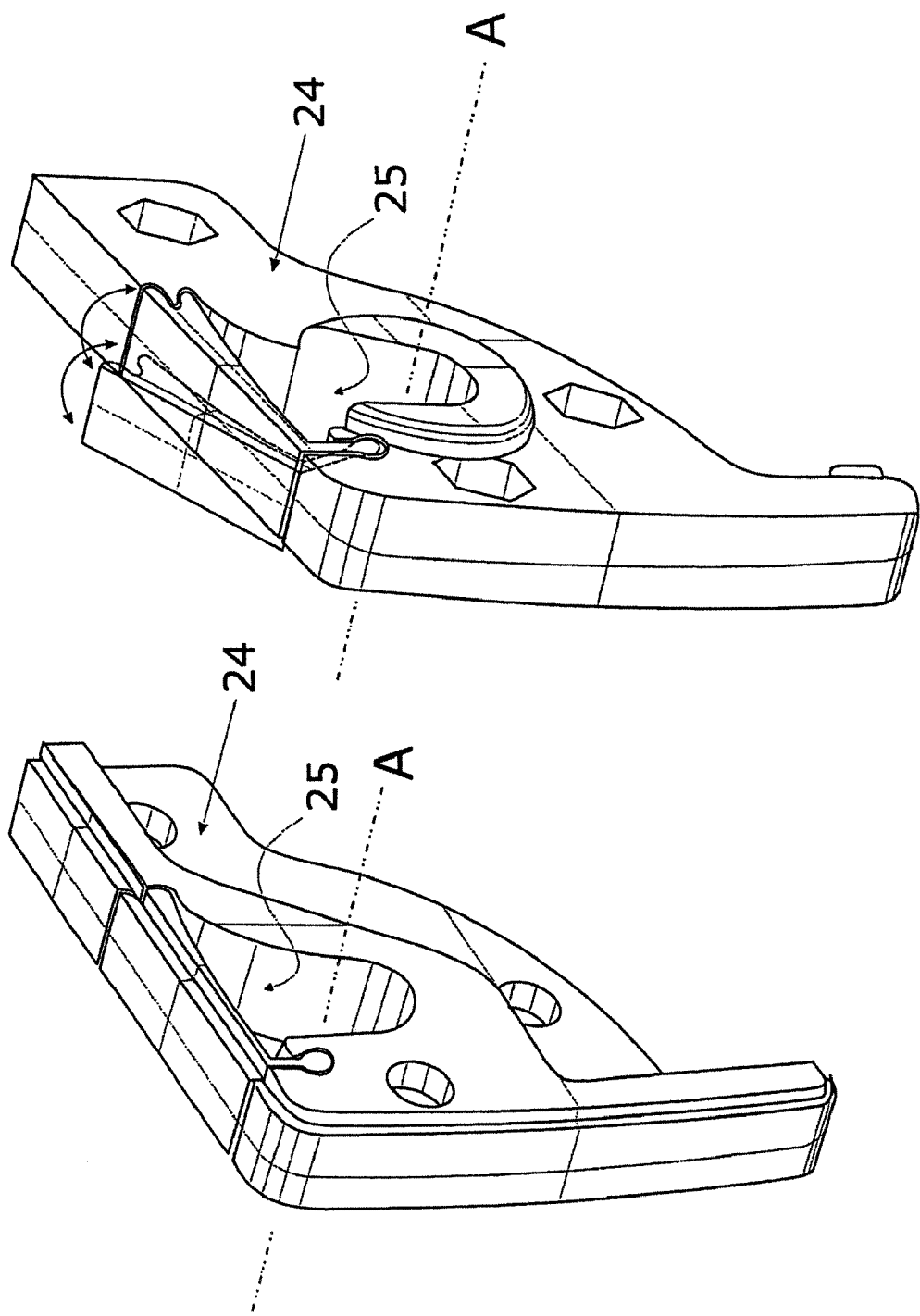
FIG. 9 is a perspective view of connector support saddle brackets of an embodiment of a seat connection mechanism in accordance with an embodiment of the present invention.

Preferably, the seat connector mechanism 19 can allow the seat bottom assembly 20 to pivot in a counter balanced gravity lifted manner. This may be accomplished by using a connector support 24 in the form of a saddle bracket secured to the beam 12 that has an inner pivot channel 25 and a seat bottom assembly 20 with a pin portion 23 protruding from the seat support 21 to interact with the inner pivot channel 25. FIG. 9 illustrates the saddle bracket of this type of seat connection mechanism.

The interacting occurs such that the pin 23 protruding from the seat bottom assembly is angled with respect to the connector support saddle bracket 24 at a specific insertion angle such that the pin 23 is insertable into and removable from the inner pivot channel 25, and such that when the pin is angled with respect to said saddle bracket portion at any other angle than the insertion angle, the pin is retained in the inner pivot channel, and thus the seat bottom is pivotably secured to the beam 12. Such a seat connector mechanism is described in more detail in U.S. patent application Ser. No. 10/067,381, the entirety of which is incorporated by reference herein.

End members 27 may be attached at the ends of the beam to define the width of the seating assembly. The end members may be merely aesthetic in nature or may be weight bearing to help support the seating assembly.

Figure 6:
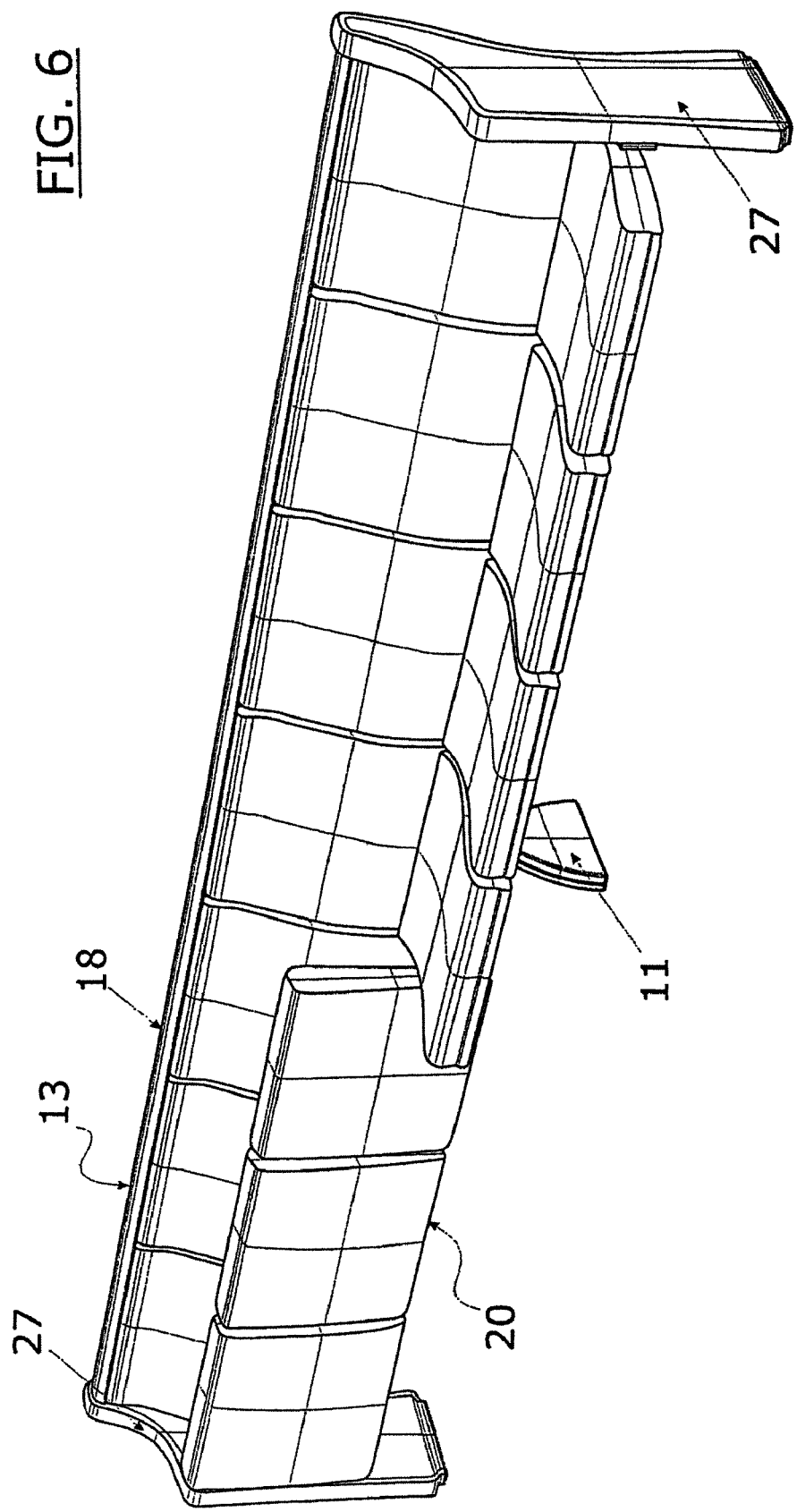
FIG. 6 is a perspective view of a seating assembly in accordance with another embodiment of the present invention showing only one base member and the end members extending to the floor serving as a support for the seating assembly.

The beam 12 may be balanced on a single base member 11. In such an embodiment, the end members can extend to the floor to help support the beam as illustrated in FIG. 6. For wider seating assemblies, additional intermediate base members may also be employed to support the beam. However, the number of base members and supporting end members is less than the number of seat bottom assemblies in the seat assembly.

Figure 7:
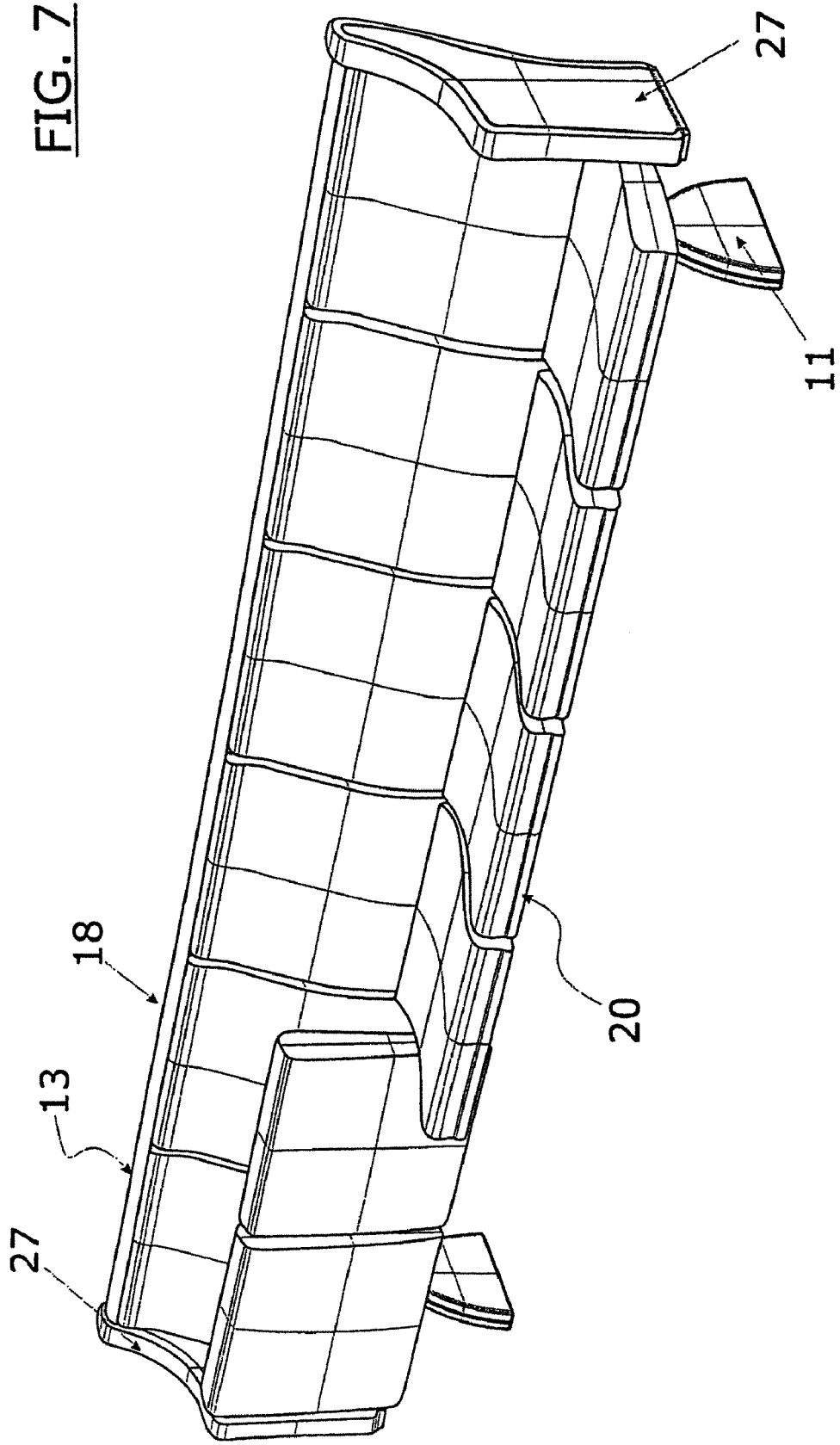
FIG. 7 is a perspective view of a seating assembly in accordance with yet another embodiment of the present invention showing seats in both the unoccupied and occupied positions having a continuous seat back member.
Figure 8:
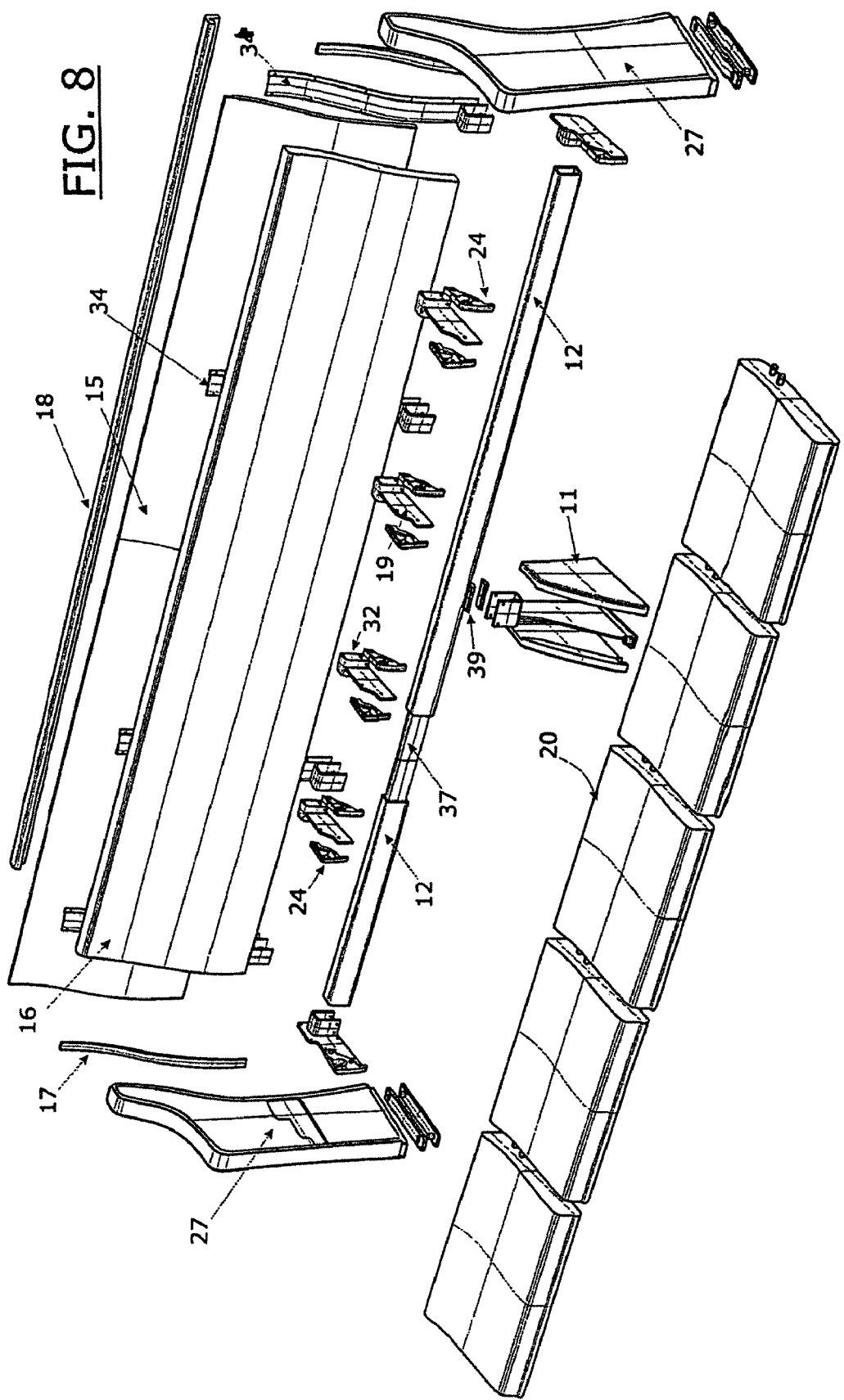
FIG. 8 is an exploded perspective view of the seating assembly of FIG. 7 showing seats in both the unoccupied and occupied positions having a continuous seat back member.

Another embodiment includes a single seat back assembly, is illustrated in FIGS. 7 and 8. A single seat back assembly may be a continuous seat back member where the back support 15 and a back pad 16 are each continuous members. In this embodiment, the seat back assembly support 34 rising substantially upwardly from the U shaped bracket 14 can support the single continuous back member.

The process of assembling and installing the seating assembly is not as costly or labor intensive as assembling and installing a customized traditional pew and allows great flexibility in seating assembly length and seating capacity. The use of the beam as the center structure of the assembly allows for a modularization of component assemblies eliminating the need for custom built pews for any desired length of pew.

Figure 1:
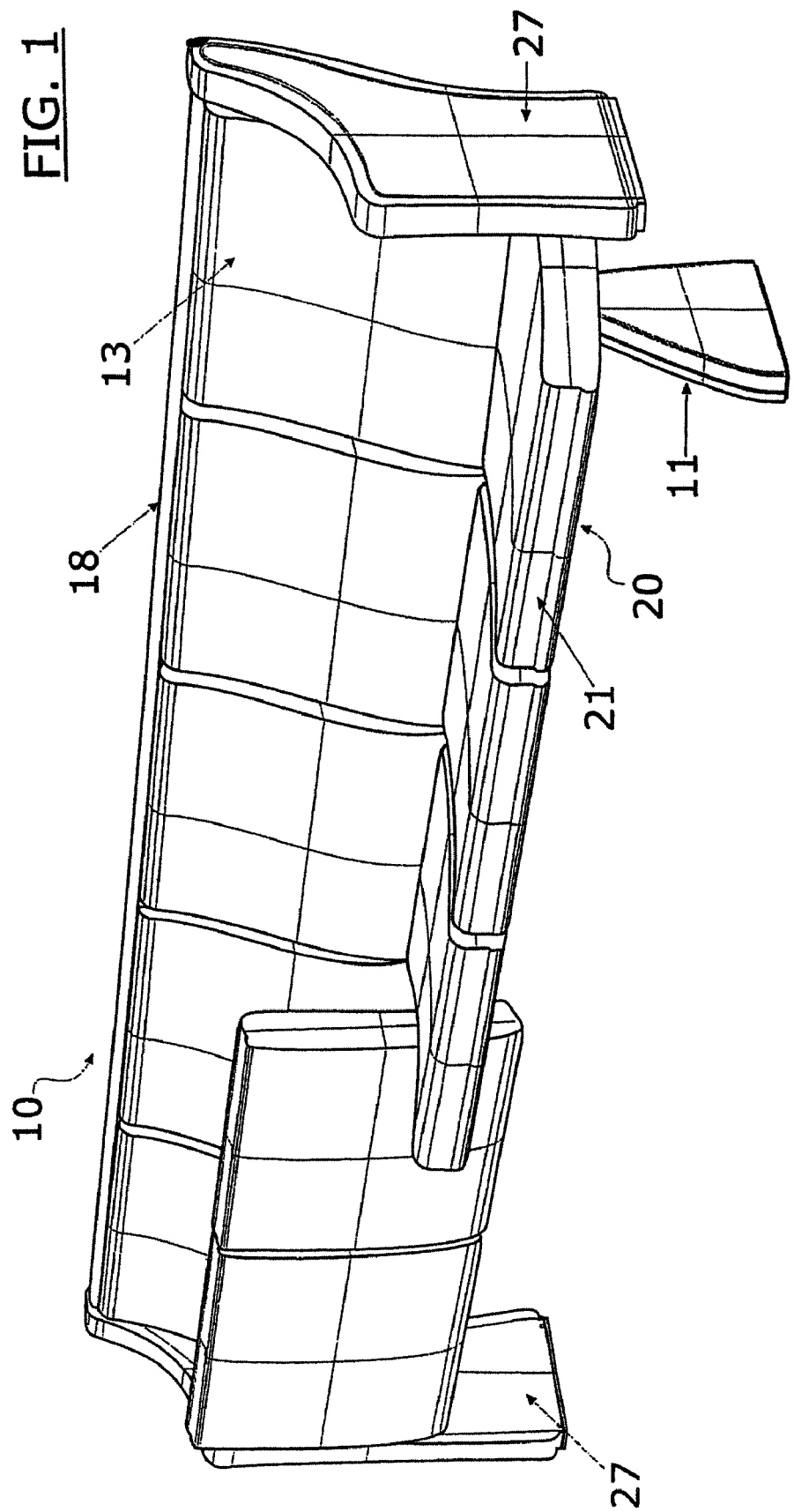
FIG. 1 is a perspective view of a seating assembly in accordance with an embodiment of the present invention showing seats in both the unoccupied and occupied positions having modularized seat back assemblies.
Figure 2:
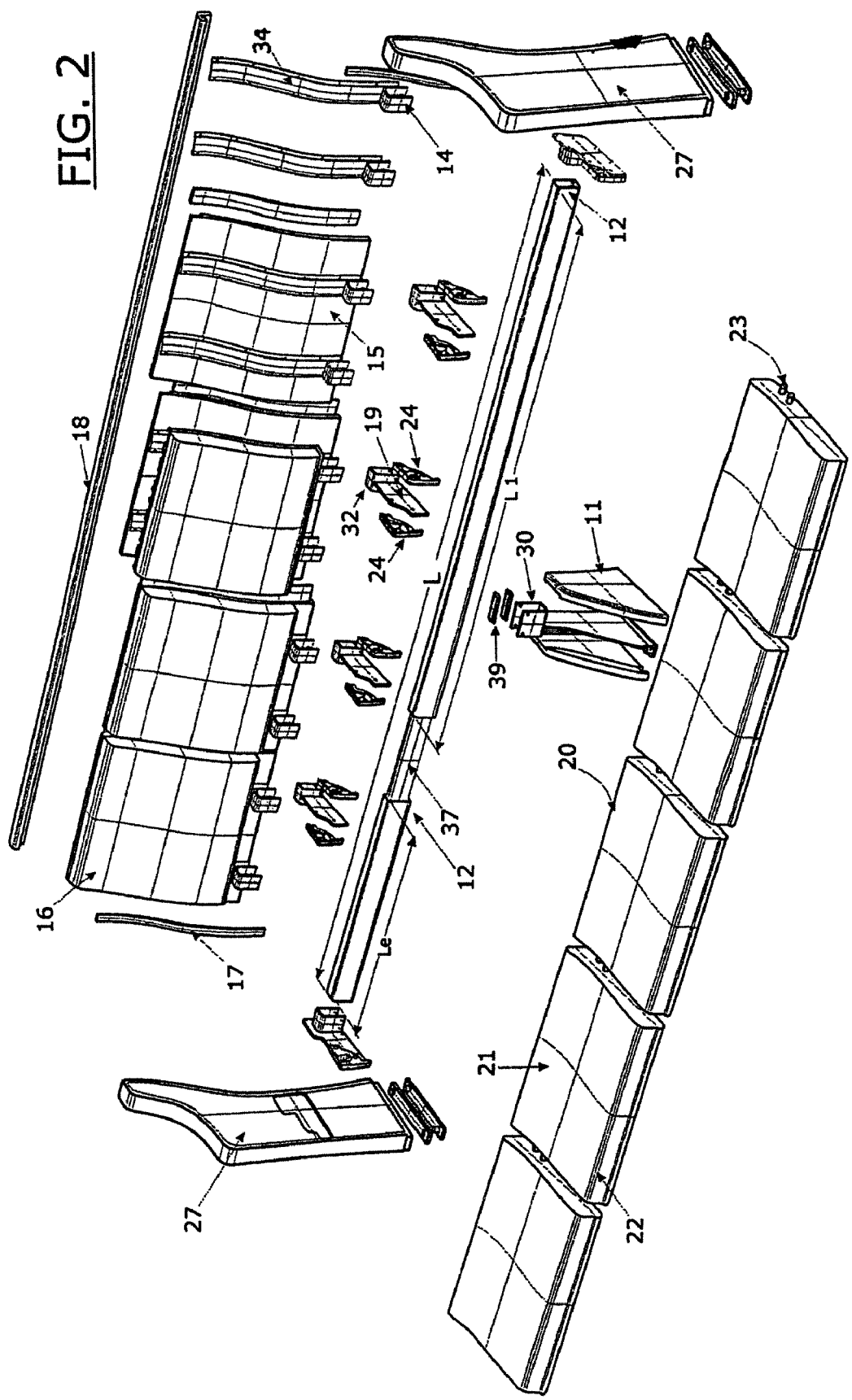
FIG. 2 is an exploded perspective view of the seating assembly of FIG. 1 showing seats in both the unoccupied and occupied positions having modularized seat back assemblies.
Figure 3:
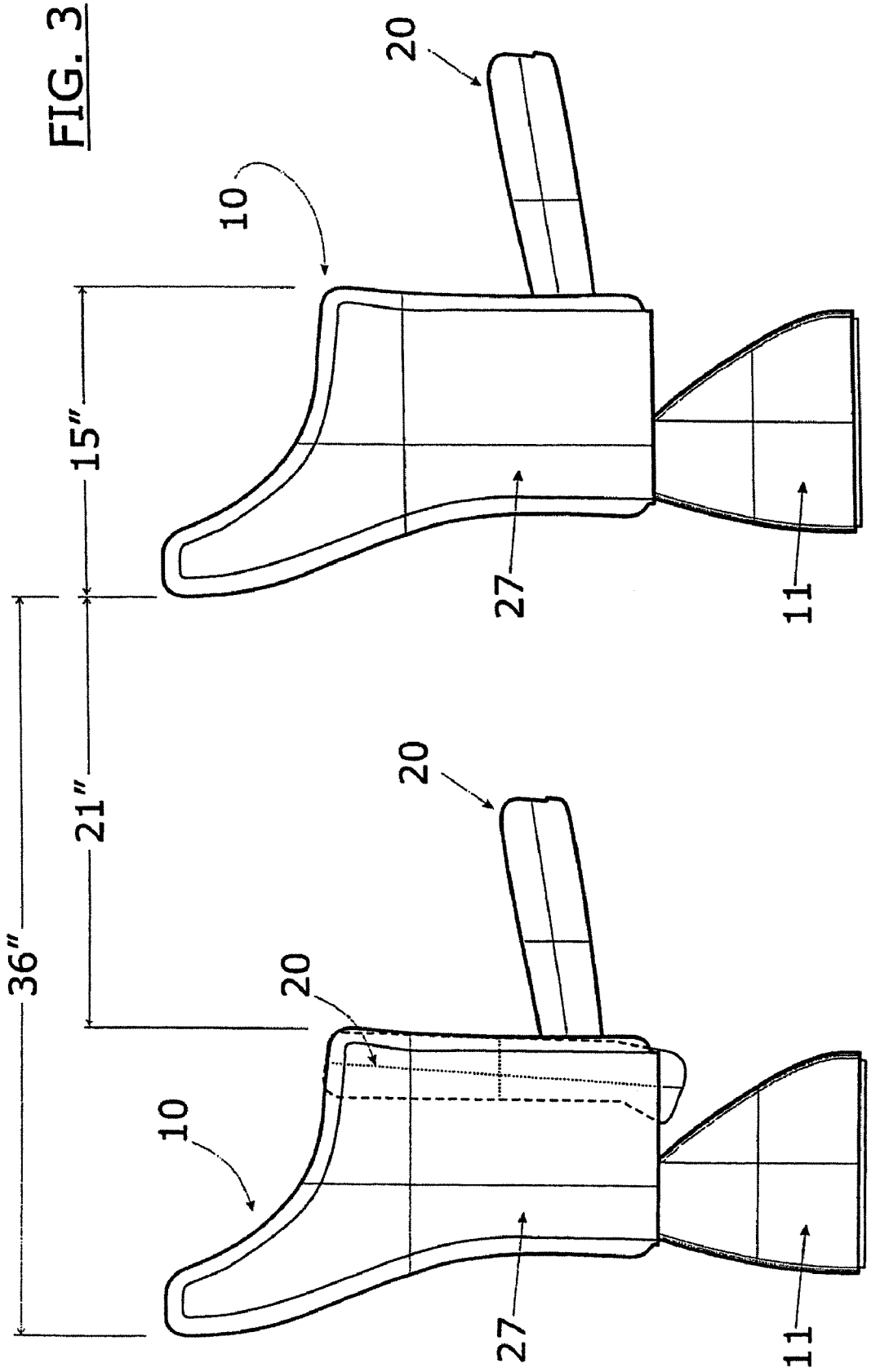
FIG. 3 is a plan side view of the seating assembly of FIG. 1 showing seats in both the unoccupied and occupied positions.
Figure 4:
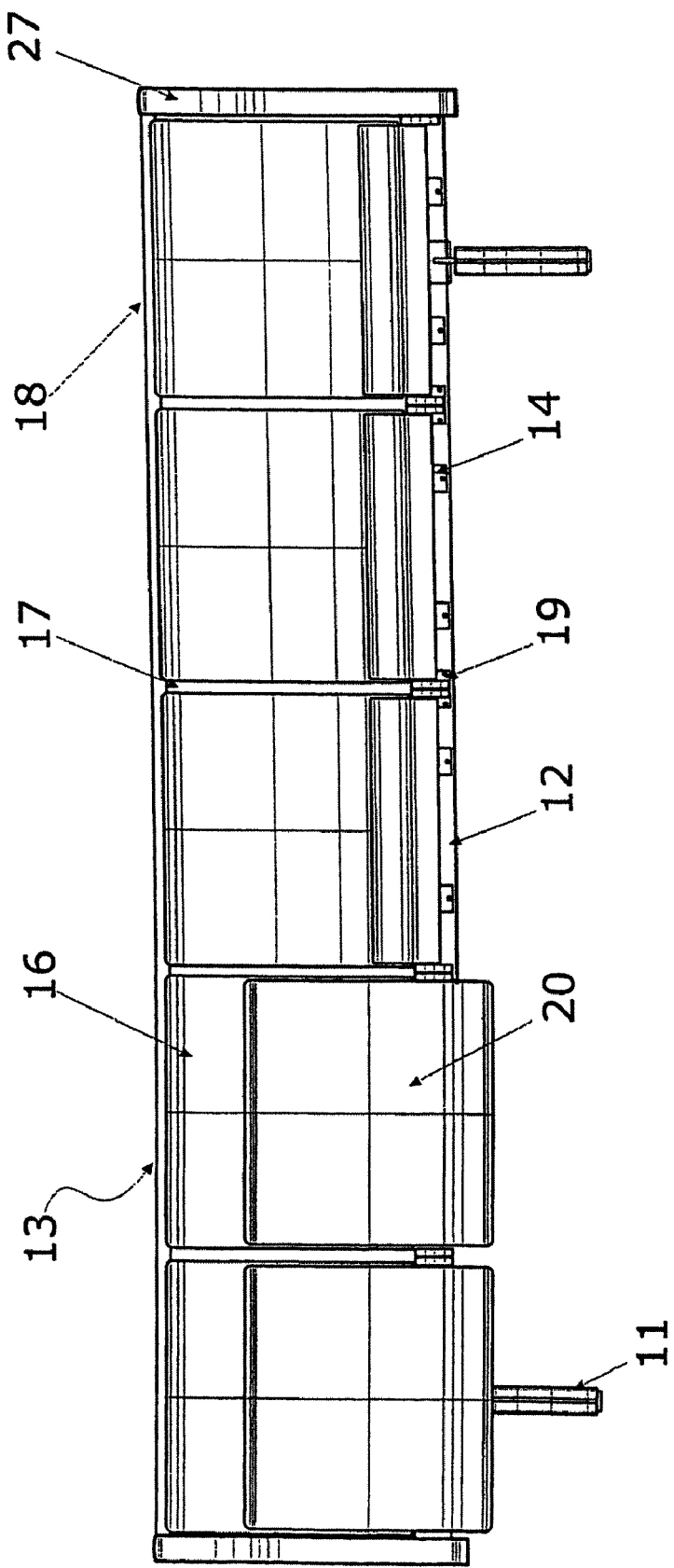
FIG. 4 is a plan front view of the seating assembly of FIG. 1 showing seats in both the unoccupied and occupied positions.
Figure 10:
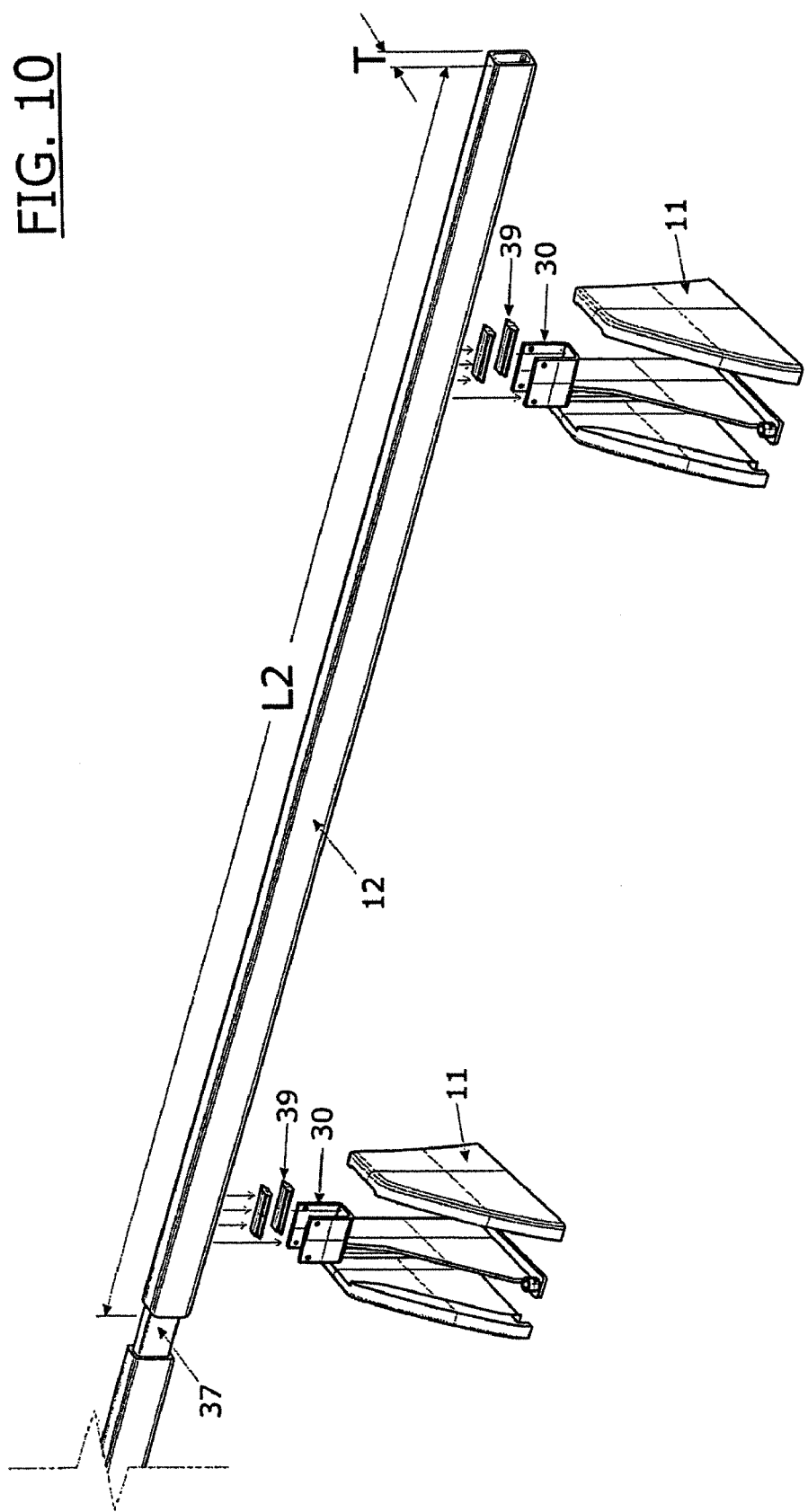
FIGS. 10-17 show a method of assembling a seat assembly in accordance with certain embodiments of the present invention.

In a first embodiment, the process begins with first determining a desired length L of the seating assembly 10. A beam 12 may be a first standard length $L_1$, or a second standard length $L_2$. The beams may be connected end to end with a force fit joint piece 37 to achieve greater desired lengths L for the seating assembly. However, the beams may also be joined in the bracket of the base member, thereby not requiring a joint piece. A combination of connected beams of first or second standard lengths can result in a beam assembly of any desired length L, as custom sized extension beam pieces of length Le are joined to the end of the assembly. A beam extension should preferably have a smaller length Le than either length $L_1$ or $L_2$ for most efficient use of beams. FIG. 2 shows a beam of a first standard length joined with a beam extension so that the beam assembly reached the desired length L. FIG. 10 shows a beam of the second standard length connected as part of a beam assembly. Once the beam components are assembled to the desired length, the beam or beam assembly is supported by at least one base member 11 in a substantially horizontal position within the U shaped brackets 30 of the base members. (FIG. 10). To help level the beam 12, supplements 39 may be placed under the beam within the base member U shaped brackets 30.

In another embodiment of a beam assembly, a predetermined desired length L of the seating assembly 10 is reached. Again, an inventory of beams 12 of a first standard length $L_1$ or a second standard length $L_2$ may be used. A third standard length $L_3$ of beam may also be inventoried. The standard lengths are selected to eliminate beam waste for a predetermined bench length, based upon a predetermined seat bottom width. The standard length beams may be cut where needed so that a combination of standard lengths and cut standard length will reach any desired bench length based upon an optimal seat bottom width.

For example, based on an average seat width of 21", a bench of any length may reached with an inventory of beams of 115.5", 168" and 189" without any waste of beam. Where a standard length beam is cut, each piece can be reused to reach desired lengths. This allows for reduced inventory and supply of beams, while offering the flexibility of having many standard sizes available. The standard beams can be precut before installation based on a requested design, eliminating the need to inventory unnecessary lengths. And the standard lengths provide cut lengths such that beam waste is eliminated.

Of course, it will be common that an average seat width different than 21" is requested. In cases where seats of less than 21" are in the design, the same combinations of beam lengths may be used to reach the predetermined bench lengths; however, each beam must be trimmed slightly. The resulting beam waste is minimal, for example, the waste is less than 1.5% is 19" width seats are request. Further, as the ends of beams are often damaged in shipping, removing the very ends of the beams is beneficial as the damaged bent end may be removed. If wider seats are requested, the standard length may be cut at difference length, still resulting in minimal waste of beam material.

Figure 11:
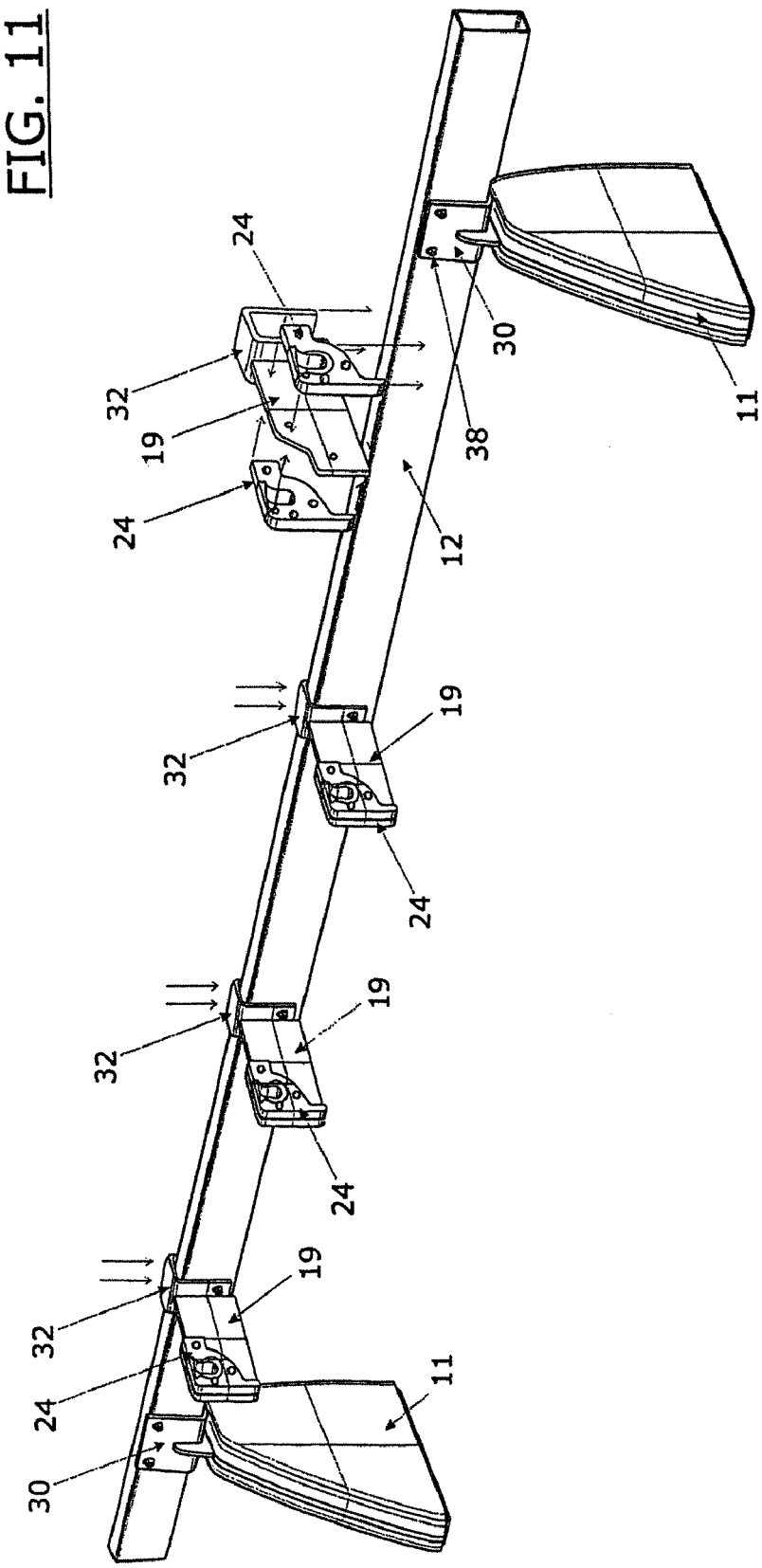

One the beam assembly is in place, the next step may be to fix the seat connection mechanisms 19 to the beam 12. The number of seat connection mechanism will be corresponding to the number of seats in the assembly. (FIG. 11). The U shaped seat connection brackets 32 may be positioned over the beam 12 to fixedly secure the seat connection mechanisms. The widths of the seat bottom assemblies 20 can be selected next.

The seat bottom assemblies may be modularized so that seating assembly may be constructed to any desired length without requiring customization of the widths of the of seat bottom assemblies. This can be achieved by a selecting a different width for at least one of the seat bottom assemblies from the selected width of at least one other seat bottom assembly. When desired, a combination of seat assembly widths may be selected from a relatively small number of standard widths. The combination of assembly widths may be selected so the determined length of the seating assembly can be reached without requiring customization of the widths of the seat back assemblies. The small number of standard widths, chosen to be appropriate for a width of a seating area, may be between sixteen and twenty-six inches in inch increments. The combinations of standard widths can be selected from a group of less than five widths, but when design requirements call for more seating variety, may be selected from a group of less than ten widths.

Traditionally, a seat bottom would have to be custom built to meet the specification of a desired length of a pew. The modularity of the present invention allows at least one seat bottom assembly to have a different width than the remaining seat bottom assemblies. This selection process for this modularity of the seat bottom assemblies can be illustrated with an example. If a pew design calls for an 18 foot pew (216 inches), nine 24 inch seat bottom assemblies could be used to meet such a specification. However, an 18½ foot (222 inches) pew may be desired. An 18½ foot pew could be assembled from three 24 inch seat bottom assemblies and six 25 inch assemblies. In some instances it may be more practical to select seat bottom assembly widths from a small number of standard widths known in the industry. In the given example, two 23 inch, two 24 inch, one 25 inch and two 26 inch seat bottom assemblies is a way to reach the desired length of 18½ feet (222 inches). In both cases, the desired length of the seating assembly is achieved without the customization of the seating components.

Compare the present invention seating assembly to the prior art. In order to make an 18½ foot traditional pew, one could either order a pew cut to the exact dimension or order nine custom seats at 24⅔". If a standard size seat is to be used with a prior art pew, then either at least one seat would still have to be custom sized, i.e. eight 24" seats and one custom seat of 30" or the total length of the pew must be limited to a standard size as well.

In addition to avoiding the time and expense of customization of seating assemblies, the modularity of the present invention allows the seating assembly length to be adjusted in one inch increments on the job site by interchanging seat bottom assembly widths.

Figure 12:
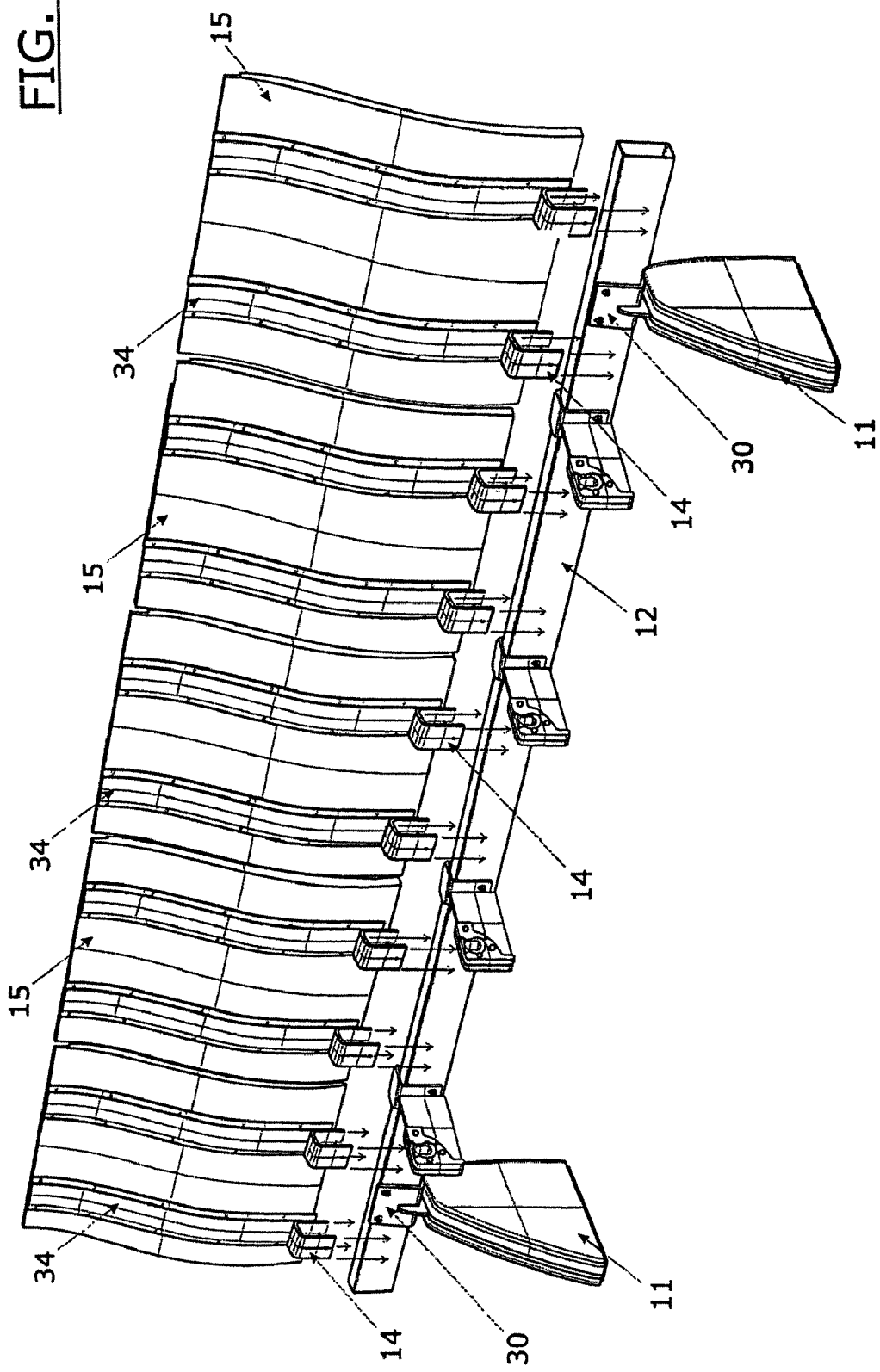
Figure 13:
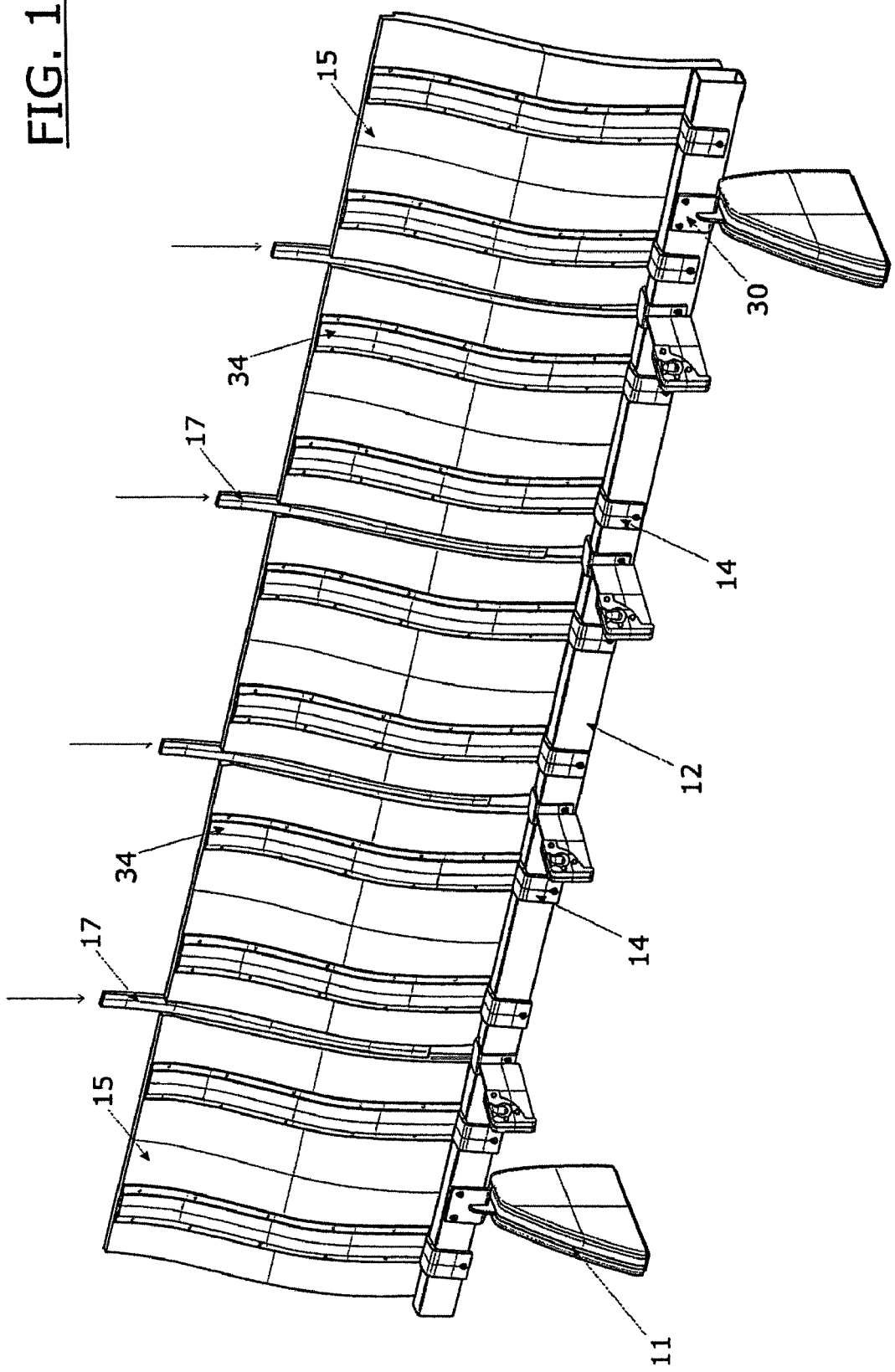
Figure 14:
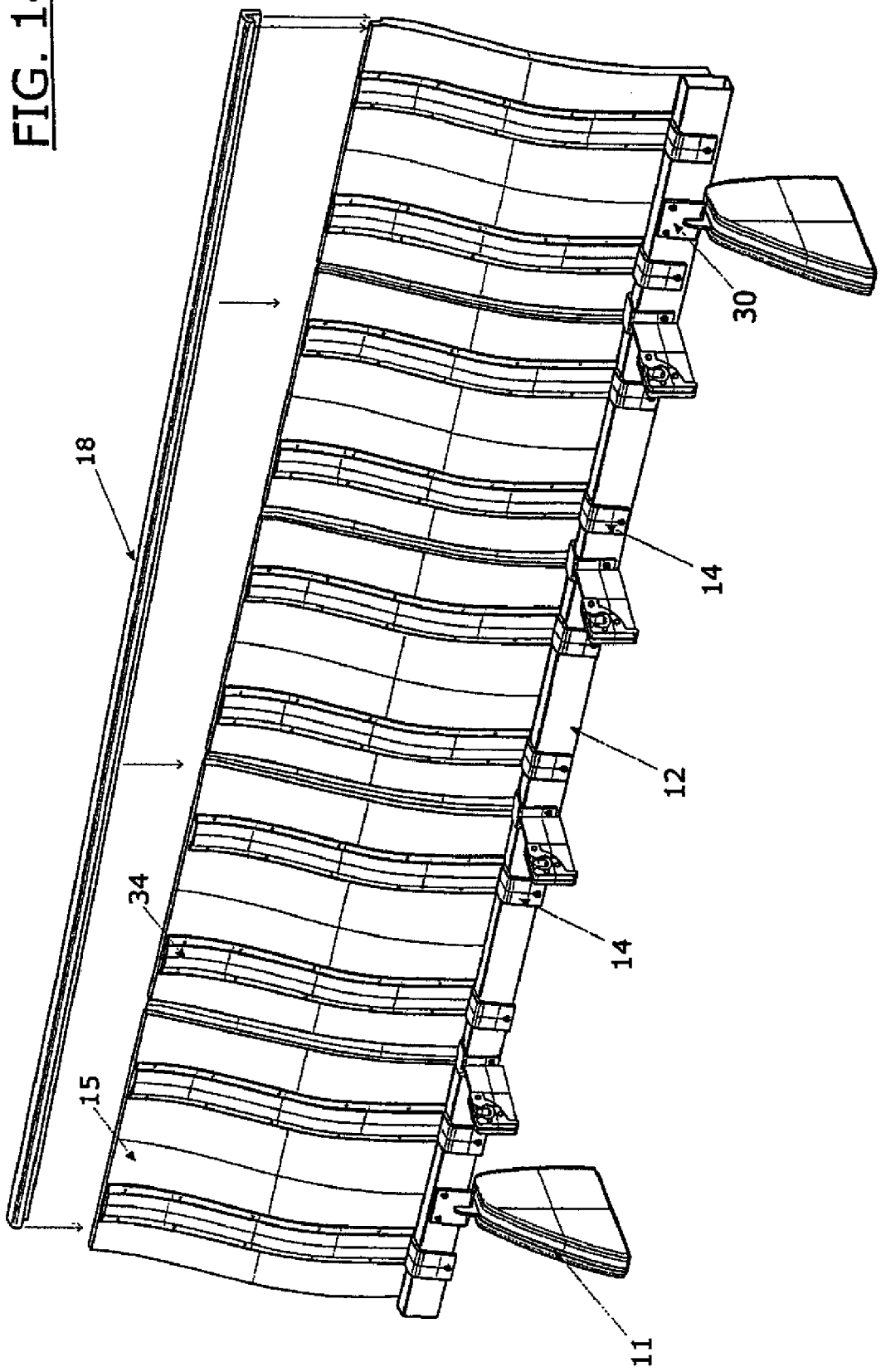
Figure 15:
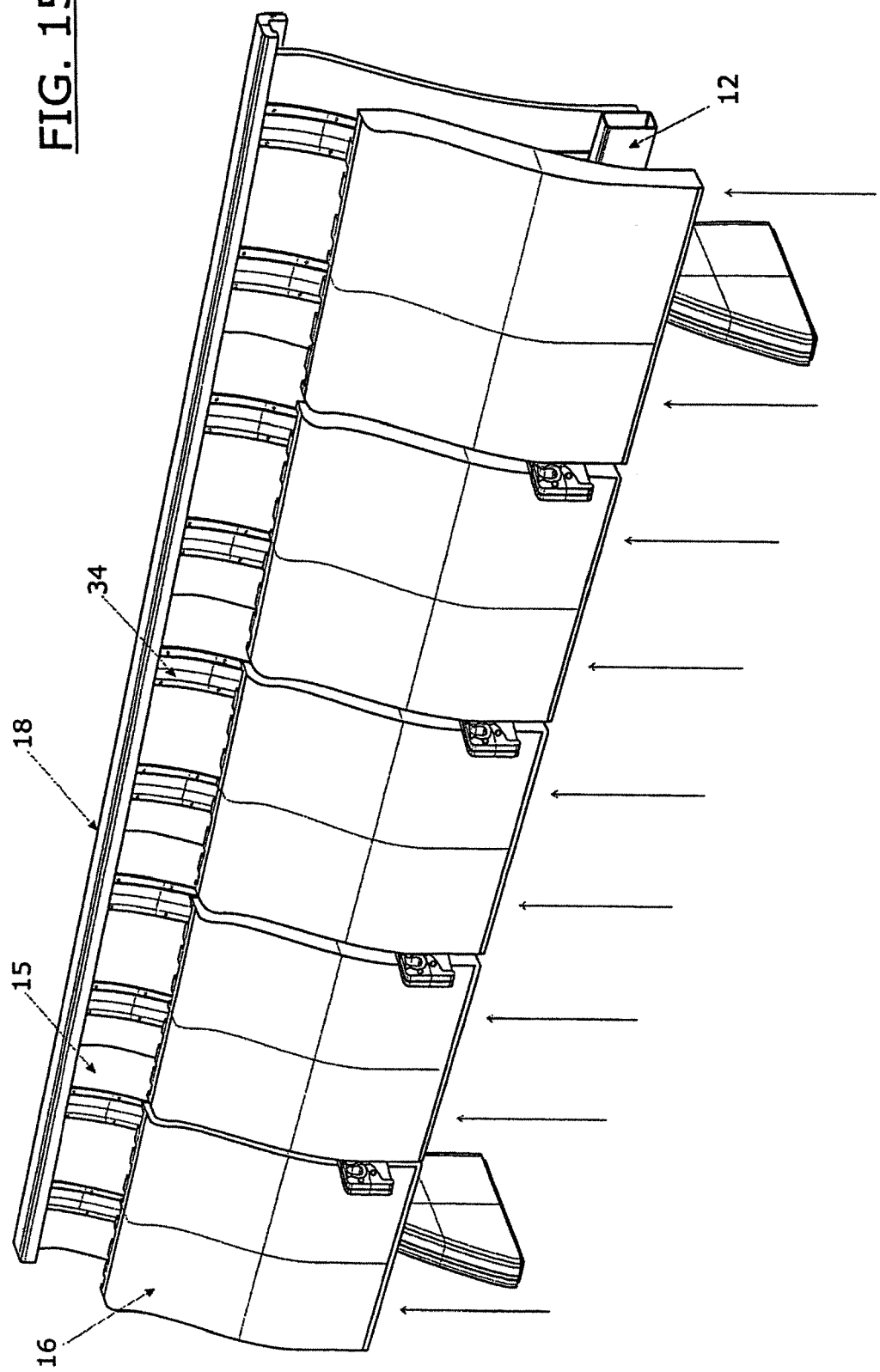

Next, the seat back assemblies 13 may be fixed to the beam. (FIGS. 12-15). While a seat back assembly may be a single continuous member, it is also envisioned that the seat bottom assembly be a width corresponding to the width of the selected seat bottom assemblies. The back support 15 may be attached to the beam 12 by positioning the U shaped brackets 14 over the beam 12. (FIG. 12). Next, back connector inserts 17 can be positioned in the grooves 33 between the back supports 15. (FIG. 13). Then, the top member 18 may be fitted across the top of the seat back assemblies 13. (FIG. 14). Finally, the back pads 16 are put in place. (FIG. 15).

Figure 16:
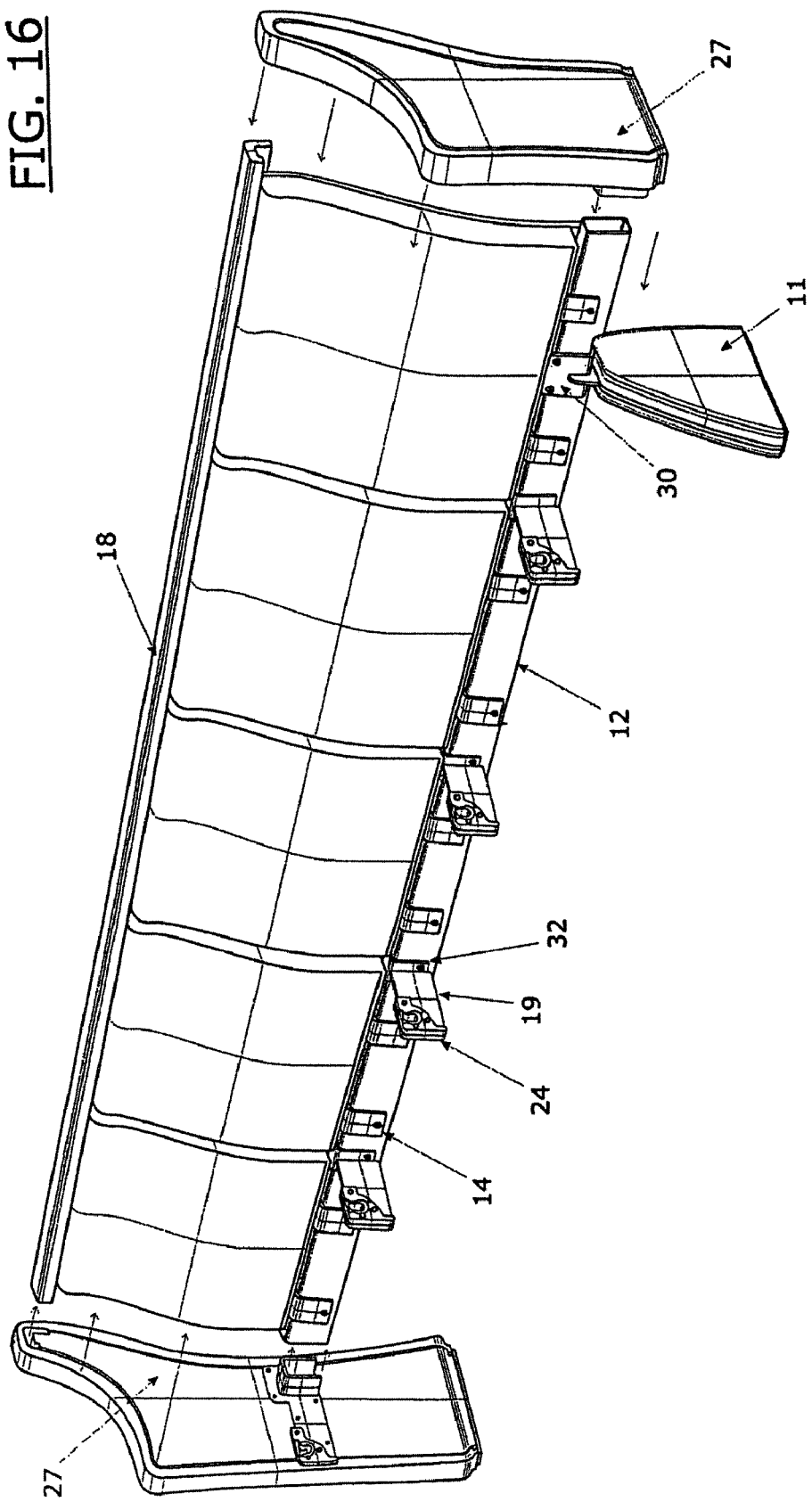

The end members 27 may be installed next. FIG. 16 shows both a weight bearing end member that extends to the floor and a shorter non-weight bearing end member. Where an end member is near a beam extension piece is joined, it is preferable that a weight bearing end member is used. Likewise, where an end member is adjacent to a base member 11, a non weight bearing end member may suffice. The type of end used may also be based on aesthetic considerations.

Similarly to the seat bottom assemblies, the seat back assembly widths may be chosen directly based on the desired width of the seating assembly, without necessarily corresponding to the width of the selected seat bottom assemblies by selecting a different width for at least one of the seat back assemblies from the selected width of at least one other seat back assemblies. The width of each of the seat back assemblies may also be selected from a relatively small number of standard widths so as to cause the seating assembly to have the desired width without requiring customization of the widths of the plurality of seat back assemblies before fixing the seat back assemblies to the beam. Again, depending on design and seating requirements, the widths can be selected from a group of less than ten, or less than five standard widths. The seat connection mechanisms are positioned appropriately along the beam to receive the seat bottom assemblies.

Figure 17:
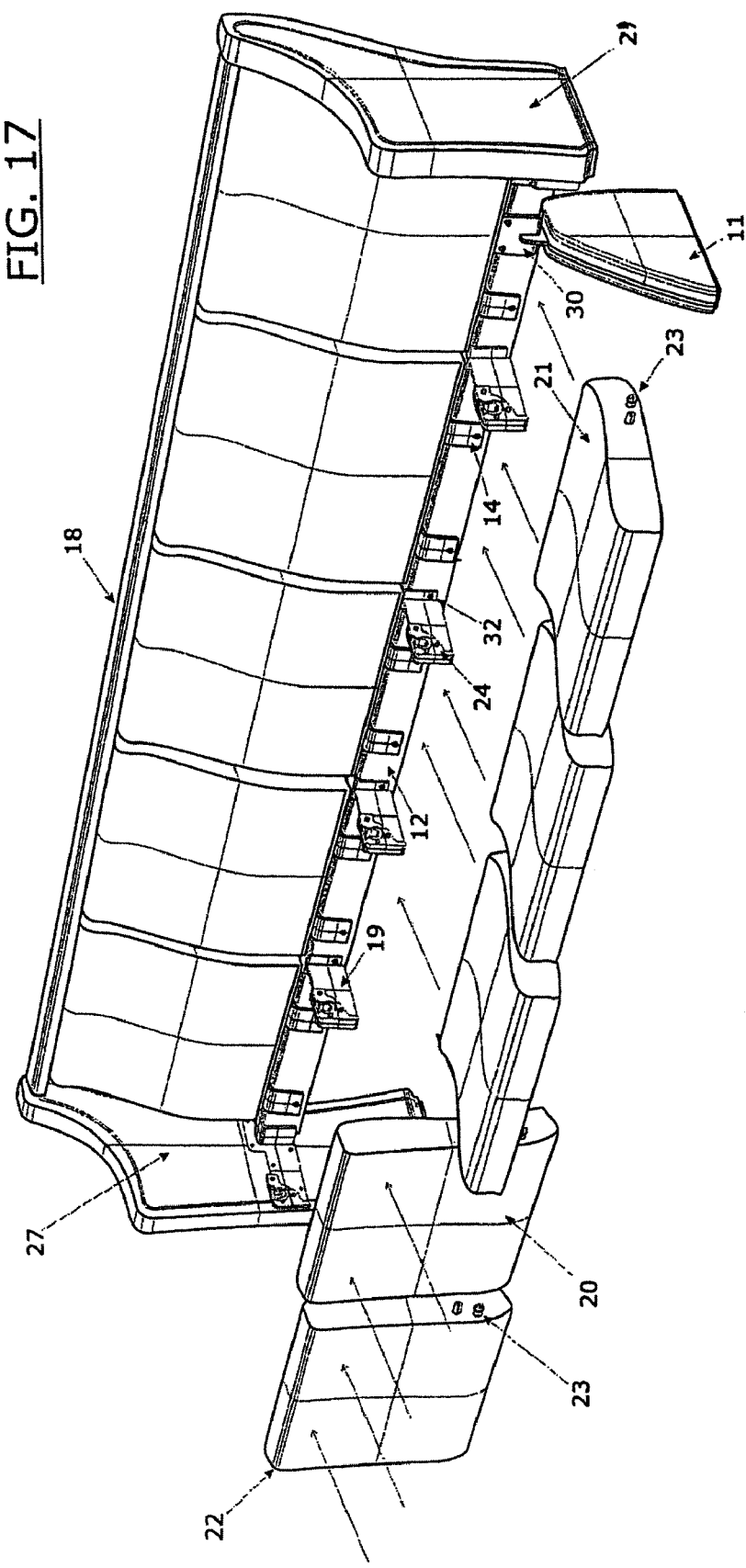
Figure 18:
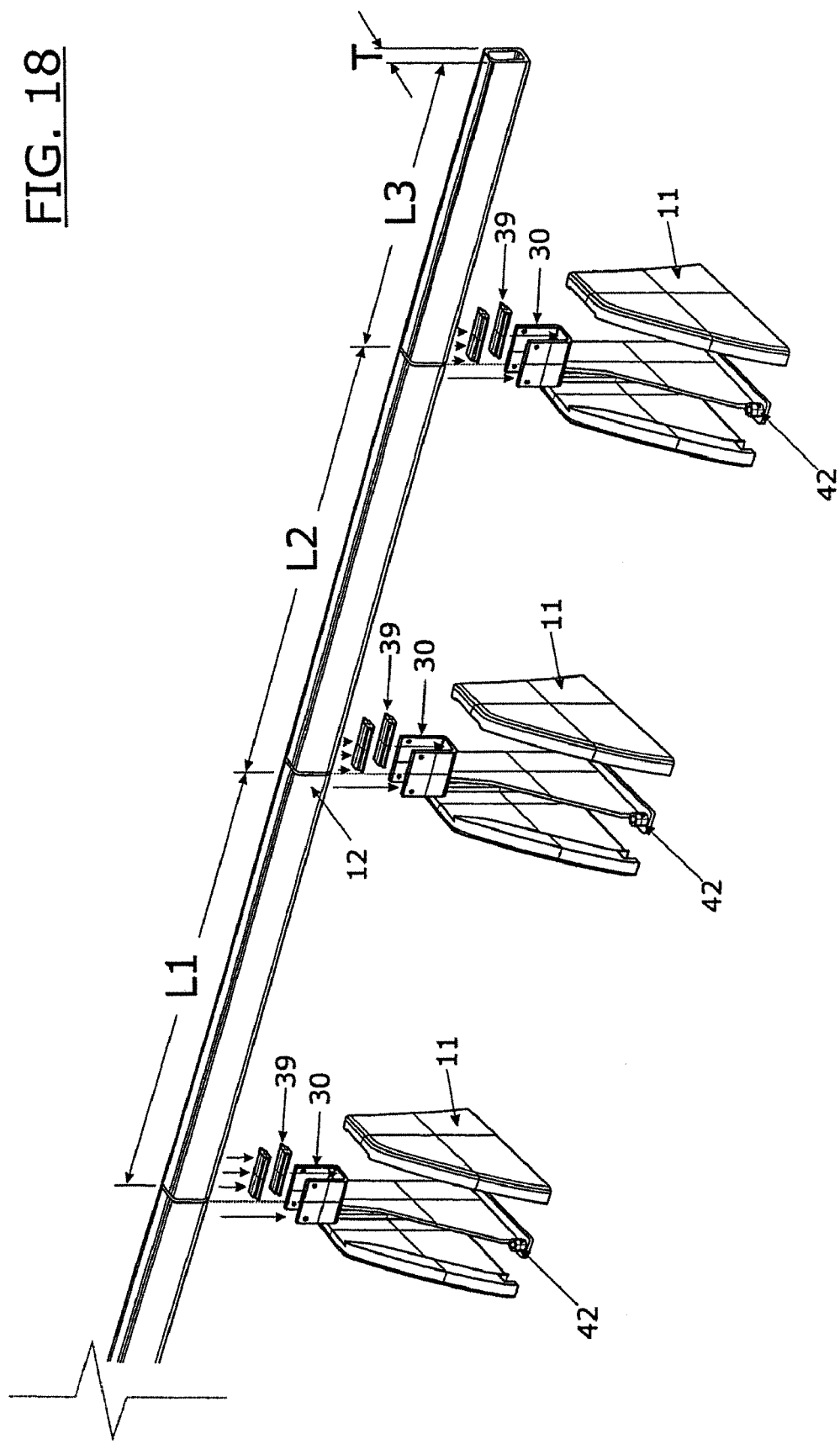
FIG. 18 shows the assembly of a beam assembly in another embodiment of the present invention.

Finally, the selected seat bottom assemblies 20 may be pivotably attached to the connector support 24 of the seat connection mechanisms 19. (FIG. 17). The seat bottom assemblies may attach to the seat supports 24 of the seat connection mechanism 19. The seat bottom assemblies may be attached so that they are individually pivotable about an axis A going through the connector supports 24 of the seat connection mechanisms. The seat bottom assemblies 20 and the seat connector mechanism 19 may be configured so that the seat bottom assemblies are counter balanced and gravity self lifting. Preferably, pins 23 protruding from the seat support 21 are inserted into the inner pivot channel 25 of the seat support of the seat connection mechanisms 19.

The base members may be secured to the floor or to a riser in a step if the seating assembly is to be a permanent fixture and not portable. The base members may be bolted 42 permanently in place. However, the seating assembly may be moved from location to location without modifying or discarding existing seat components. The seating assembly may be reconstructed by simply adding additional seats and support beams to satisfy new row lengths.

Although the invention has been described with reference to a particular arrangement of parts, features and the like, these are not intended to exhaust all possible arrangements or features, and indeed many other modifications and variations will be ascertainable to those of skill in the art.

What is claimed is:

1. A method of assembling a bench style seating assembly, comprising the steps of:
   determining a desired length of the seating assembly;
   selecting a beam;
   supporting said beam in a substantially horizontal position on at least one base;
   securing the at least one base to a floor;
   fixing at least one seat back assembly to the beam;
   fixing a plurality of seat connection mechanisms to the beam;
   selecting a width of each of a plurality of seat bottom assemblies so as to cause the seating assembly to have the desired length, a selected width of at least one of the plurality of seat bottom assemblies being different than a selected width of at least one other of the plurality of seat bottom assemblies, wherein the width of each of the plurality of seat bottom assemblies is selected from a group of less than ten standard widths so as to cause the seating assembly to have the desired length without requiring customization of the widths of the plurality of seat bottom assemblies; and
   attaching the plurality of seat bottom assemblies pivotably to the beam by the plurality of seat connection mechanisms, each of said plurality of seat bottom assemblies being pivotable about an axis through at least one of the plurality of seat connection mechanisms.

2. The method described in claim 1, further comprising the step of installing an end on either end of the seating assembly to define the length of the seat assembly.

3. The method described in claim 1, wherein, said step of selecting a beam comprises the steps of:
   selecting from an inventory of at least first and second standard beam lengths a first appropriate number of beam portions;
   cutting a second appropriate number of beam portions from the at least the first and second standard beam lengths based on an optimal seat bottom width such that a combination of the first appropriate number of beam portions and the second appropriate number of cut beam portions reach a predetermined beam length without beam waste; and
   joining end to end the first appropriate number of beam portions and the second appropriate number of cut beam portions so that the beam is the predetermined length without beam waste.

4. The method described in claim 3, wherein, each beam length of the combination of the first appropriate number of beam portions and second appropriate number of cut beam portions is trimmed such that the beam reaches the predetermined length with minimized beam waste when a requested seat bottom width is not the optimal seat bottom width.

5. The method described in claim 1, wherein, said step of fixing at least one seat back assembly to the beam comprises the step of fixing a seat back assembly, which is a single continuous back member to the beam.

6. The method described in claim 1, wherein, said step of fixing at least one seat back assembly to the beam comprises the steps of: selecting a width of each of a plurality of seat back assemblies so as to cause the seating assembly to have the desired length, a selected width of at least one of the plurality of seat back assemblies being different than a selected width of at least one other of the plurality of seat back assemblies; and fixing the plurality of seat back assemblies to the beam.

7. The method described in claim 6, wherein the width of each of the plurality of seat back assemblies is selected from a group of less than ten standard widths so as to cause the seating assembly to have the desired length without requiring customization of the widths of the plurality of seat back assemblies.

8. The method described in claim 1, wherein, said step of supporting said beam in a substantially horizontal position on at least one base further comprises positioning the at least one base substantially beneath at least one seat bottom assembly.

9. The method described in claim 1, wherein, each of the plurality of seat bottom assemblies is separately pivotable.

10. A method of assembling a bench style seating assembly, comprising the steps of:
    determining a desired length of the seating assembly;
    selecting a beam;
    supporting said beam in a substantially horizontal position on at least one base;
    securing the at least one base to a floor;
    fixing at least one seat back assembly to the beam;
    fixing a plurality of seat connection mechanisms to the beam;
    selecting a width of each of a plurality of seat bottom assemblies so as to cause the seating assembly to have the desired length, a selected width of at least one of the plurality of seat bottom assemblies being different than a selected width of at least one other of the plurality of seat bottom assemblies; and
    attaching the plurality of seat bottom assemblies pivotably to the beam by the plurality of seat connection mechanisms, each of said plurality of seat bottom assemblies being pivotable about an axis through at least one of the plurality of seat connection mechanisms;
    wherein said step of selecting a beam comprises the steps of:
    selecting two or more beam portions from at least one of a first beam standard length and a second beam standard length;

joining the two or more beam portions end to end, a length of the joined two or more beam portions being within at least one of the first and second beam standard lengths of the desired length; and joining end to end a beam extension having a custom length, said custom length being less than at least one of the first and second beam standard lengths, with the joined two or more beam portions so as to cause the seating assembly to have the desired length without requiring customization of the beams portions.

11. A method of assembling a bench style seating assembly, comprising the steps of:

determining a desired length of the seating assembly;

assembling a beam by joining two or more beam portions end to end, wherein the two or more beam portions are selected from at least one of a first beam standard length and a second beam standard length, wherein said step of assembling the beam further comprises the step of joining end to end a beam extension having a custom length, wherein the said custom length being less than at least one of the first and second beam standard lengths;

supporting said beam in a substantially horizontal position on at least one base;

securing the at least one base to at least one of a floor and a step riser;

fixing at least one seat back assembly to the beam;

fixing a plurality of seat connection mechanisms to the beam;

selecting a width of each of a plurality of seat bottom assemblies so as to cause the seating assembly to have the desired length; and attaching the plurality of seat bottom assemblies pivotably to the beam by the plurality of seat connection mechanisms, each of said plurality of seat bottom assemblies being pivotable about an axis through at least one of the plurality of seat connection mechanisms.

12. The method according to claim 11, wherein the beam includes a substantially rectangular cross section;

wherein the at least one seat back assembly is fixed to the beam via a bracket including an opening corresponding to a width of the beam and installed over a top of the beam.

13. A method of assembling a bench style seating assembly, comprising the steps of:

determining a desired length of the seating assembly;

selecting a beam;

supporting said beam in a substantially horizontal position on at least one base;

fixing at least one seat back assembly to the beam;

fixing a plurality of seat connection mechanisms to the beam;

selecting a width of each of a plurality of seat bottom assemblies so as to cause the seating assembly to have the desired length, a selected width of at least one of the plurality of seat bottom assemblies being different than a selected width of at least one other of the plurality of seat bottom assemblies; and attaching the plurality of seat bottom assemblies pivotably to the beam by the plurality of seat connection mechanisms, each of said plurality of seat bottom assemblies being pivotable about an axis through at least one of the plurality of seat connection mechanisms;

wherein the method further comprises the step of configuring the plurality of seat connection mechanisms such that the plurality of seat bottom assemblies are gravity lifted.

14. A method of assembling a bench style seating assembly, comprising the steps of:

determining a desired length of the seating assembly;

selecting a beam including two or more beam portions joined end to end;

supporting said beam in a substantially horizontal position on at least one base;

fixing at least one seat back assembly to the beam;

fixing a plurality of seat connection mechanisms to the beam;

selecting a width of each of a plurality of seat bottom assemblies, so as to cause the seating assembly to have the desired length, from a group of less than ten standard widths so as to cause the seating assembly to have the desired length without requiring customization of the widths of the plurality of seat bottom assemblies; and attaching the plurality of seat bottom assemblies pivotably to the beam by the plurality of seat connection mechanisms, each of said plurality of seat bottom assemblies being pivotable about an axis through at least one of the plurality of seat connection mechanisms;

wherein, said step of selecting a beam comprises the steps of:

selecting from an inventory of at least first and second standard beam lengths a first appropriate number of beam portions;

cutting a second appropriate number of beam portions from the at least the first and second standard beam lengths based on an optimal seat bottom width such that a combination of the first appropriate number of beam portions and the second appropriate number of cut beam portions reach a predetermined beam length without beam waste; and joining end to end the first appropriate number of beam portions and second appropriate number of cut beam portions so that the beam is the predetermined length without beam waste.

15. The method described in claim 14, wherein, each beam length of the combination of the first appropriate number of beam portions and second appropriate number of cut beam portions is trimmed such that the beam assembly reaches the predetermined length with minimized beam waste when a requested seat bottom width is not the optimal seat bottom width.

16. A method of assembling a bench style seating assembly, comprising the steps of:

determining a desired length of the seating assembly;

selecting a beam including two or more beam portions joined end to end;

supporting said beam in a substantially horizontal position on at least one base;

fixing at least one seat back assembly to the beam;

fixing a plurality of seat connection mechanisms to the beam;

selecting a width of each of a plurality of seat bottom assemblies, so as to cause the seating assembly to have the desired length, from a group of less than ten standard widths so as to cause the seating assembly to have the desired length without requiring customization of the widths of the plurality of seat bottom assemblies; and attaching the plurality of seat bottom assemblies pivotably to the beam by the plurality of seat connection mechanisms, each of said plurality of seat bottom assemblies being pivotable about an axis through at least one of the plurality of seat connection mechanisms;

wherein the two or more beam portions are selected from at least one of a first beam standard length and a second beam standard length;

wherein a length of the joined two or more beam portions is within at least one of the first and second beam standard lengths of the desired length; and wherein said step of selecting a beam further comprises joining end to end a beam extension having a custom length, said custom length being less than at least one of the first and second beam standard lengths, with the joined two or more beam portions so as to cause the seating assembly to have the desired length without requiring customization of the beam portions.

17. The method described in claim 16, wherein, said step of supporting said beam in a substantially horizontal position on at least one base further comprises positioning the at least one base substantially beneath at least one seat bottom assembly.

18. The method described in claim 16, wherein, each of the plurality of seat bottom assemblies is separately pivotable.

19. The method described in claim 16, wherein the width of each of the plurality of seat bottom assemblies is selected, a selected width of at least one of the plurality of seat bottom assemblies being different than a selected width of at least one other of the plurality of seat bottom assemblies.

20. The method described in claim 16, wherein, said step of fixing at least one seat back assembly to the beam comprises the steps of:

selecting a width of each of a plurality of seat back assemblies so as to cause the seating assembly to have the desired length, a selected width of at least one of the plurality of seat back assemblies being different than a selected width of at least one other of the plurality of seat back assemblies; and fixing the plurality of seat back assemblies to the beam.

21. The method described in claim 20, wherein the width of each of the plurality of seat back assemblies is selected from a group of less than ten standard seat back widths so as to cause the seating assembly to have the desired length without requiring customization of the widths of the plurality of seat back assemblies.

22. The method described in claim 20, wherein, the width of each of the plurality of seat back assemblies is selected to correspond to a width of each of the plurality of seat bottom assemblies.

* * * * *